US010846579B2

(12) United States Patent
Park

(10) Patent No.: US 10,846,579 B2
(45) Date of Patent: Nov. 24, 2020

(54) APPARATUS AND METHOD FOR EMITTING MAGNETIC SIGNAL USING PLURALITY OF FREQUENCIES

(71) Applicant: Samsung Electronics Co., Ltd., Gyeonggi-do (KR)

(72) Inventor: Jeong-Hoon Park, Gyeonggi-do (KR)

(73) Assignee: Samsung Electronics Co., Ltd., Yeongtong-gu (KR)

( * ) Notice: Subject to any disclaimer, the term of this patent is extended or adjusted under 35 U.S.C. 154(b) by 511 days.

(21) Appl. No.: 15/706,907

(22) Filed: Sep. 18, 2017

(65) Prior Publication Data

US 2018/0107908 A1      Apr. 19, 2018

(30) Foreign Application Priority Data

Oct. 13, 2016   (KR) .......................... 10-2016-0133023
Jul. 12, 2017   (KR) .......................... 10-2017-0088636

(51) Int. Cl.
*G06K 19/06*      (2006.01)
*G07F 7/08*       (2006.01)
(Continued)

(52) U.S. Cl.
CPC ....... *G06K 19/06206* (2013.01); *G06K 7/084* (2013.01); *G06K 7/087* (2013.01);
(Continued)

(58) Field of Classification Search
CPC .............................. G06K 7/084; G06K 7/087
See application file for complete search history.

(56) References Cited

U.S. PATENT DOCUMENTS 5,254,843 A * 10/1993 Hynes .................... G06K 7/084
                                                         235/449
6,476,743 B1 * 11/2002 Brown ................. G06K 7/0166
                                                         235/449
(Continued)

FOREIGN PATENT DOCUMENTS

CN          103280940 A        9/2013
EP          3 035 230 A1       6/2016
(Continued)

OTHER PUBLICATIONS

European Search Report dated Jul. 17, 2018.
International Search Report dated Jan. 22, 2018.

*Primary Examiner* — Suezu Ellis
(74) *Attorney, Agent, or Firm* — Cha & Reiter, LLC.

(57) ABSTRACT

An electronic device according to one embodiment may include a memory, a coil, a waveform-generating circuit, and a processor configured to: obtain card information stored in the memory; when a first part of the card information is a first value, apply a first voltage or a first current having a first waveform to the coil, where a first tangential slope of a first amplitude of the first waveform for time changes in at least a part of a first interval corresponding to the first part; and when a second part of the card information is a second value, apply a second voltage or a second current having current second waveform to the coil, where a second tangential slope of a second amplitude of the second waveform for time changes in at least a part of a second interval corresponding to the second part.

12 Claims, 20 Drawing Sheets

(51) Int. Cl.
*G06Q 20/34* (2012.01)
*H04W 4/80* (2018.01)
*H04B 5/00* (2006.01)
*H04W 4/02* (2018.01)
*H04W 4/70* (2018.01)
*G06Q 20/32* (2012.01)
*G06K 7/08* (2006.01)
*G06K 7/10* (2006.01)

(52) U.S. Cl.
CPC ... *G06K 7/10297* (2013.01); *G06K 19/06196* (2013.01); *G06Q 20/3278* (2013.01); *G06Q 20/352* (2013.01); *G07F 7/0893* (2013.01); *H04B 5/0031* (2013.01); *H04W 4/80* (2018.02); *H04W 4/027* (2013.01); *H04W 4/70* (2018.02)

(56) References Cited

U.S. PATENT DOCUMENTS

| | | | |
|---|---|---|---|
| 8,210,440 B1* | 7/2012 | Pinai | G06K 7/084 235/494 |
| 8,602,312 B2 | 12/2013 | Cloutier et al. | |
| 8,727,219 B1 | 5/2014 | Mullen | |
| 8,814,046 B1 | 8/2014 | Wallner | |
| 8,827,153 B1* | 9/2014 | Rhoades | G06K 19/06206 235/380 |
| 9,064,194 B1 | 6/2015 | Bohac, Jr. | |
| 2008/0126262 A1* | 5/2008 | Brady | G07F 7/1008 705/75 |
| 2011/0174874 A1 | 7/2011 | Poznansky et al. | |
| 2011/0181232 A1 | 7/2011 | Krishnamoorthy et al. | |
| 2012/0037709 A1* | 2/2012 | Cloutier | G06K 19/06206 235/488 |
| 2014/0002180 A1 | 1/2014 | Daghighian et al. | |
| 2014/0070006 A1* | 3/2014 | Weldele | G06K 7/084 235/449 |
| 2015/0186882 A1 | 7/2015 | Vanetti et al. | |
| 2018/0107849 A1* | 4/2018 | Park | G06T 7/70 |
| 2019/0130138 A1* | 5/2019 | Liu | G06K 19/06206 |

FOREIGN PATENT DOCUMENTS

| | | |
|---|---|---|
| KR | 10-2016-0058913 A | 5/2016 |
| WO | 2011/103160 A1 | 8/2011 |
| WO | 2016007475 A1 | 1/2016 |

* cited by examiner

APPARATUS AND METHOD FOR EMITTING MAGNETIC SIGNAL USING PLURALITY OF FREQUENCIES

CLAIM OF PRIORITY

This application claims the priority under 35 U.S.C. § 119(a) to Korean Application Serial Nos. 10-2016-0133023 & 10-2017-0088636, which was filed in the Korean Intellectual Property Office on Oct. 13, 2016 & Jul. 12, 2017, the entire content of which is hereby incorporated by reference.

TECHNICAL FIELD

The present disclosure relates to a method and apparatus for emitting a magnetic signal using a plurality of frequencies.

BACKGROUND

Magnetic stripe payment cards typically include magnetic substances. Correspondingly, Point of Sale (POS) terminals for approving payments made by magnetic stripe payment cards may include read headers for detecting change in the magnetic field caused from the magnetic stripe payment cards when the magnetic substances is moved by the user. In operation, a user may swipe the magnetic stripe payment card after inserting the magnetic stripe payment card into the read header of the POS terminal. The magnetic field may change due to the movement of the payment card, and the POS terminal may detect the change in the magnetic field. The POS terminal may obtain payment data, e.g. card information based on the change in the magnetic field.

Meanwhile, electronic devices that use magnetic secured transfer or magnetic striped transmission (MST) communication may generate and emit magnetic fields that change as magnetic substances in the electronic devices move. The changed magnetic field may be detected by the POS terminal. Accordingly, an electronic device that can transmit payment data to an existing POS terminal is provided.

SUMMARY

A conventional electronic device that uses MST communication applies power in square waves to a coil in order to generate a magnetic field. To enable a POS terminal to detect the magnetic field generated by the electronic device, the electronic device must generate relatively large magnetic fields. To generate a relatively large magnetic field, relatively high power needs to be applied to the coil. Accordingly, the electronic device consumes relatively large amount of power in order to perform MST communication. Therefore, when the amount of power remaining in the electronic device is relatively low, reliable electronic payment may not occur, which is a drawback.

Various embodiments of the present disclosure solve the above-described drawback or other drawbacks, and an electronic device and a control method thereof according to various embodiments of the present disclosure may apply power in relatively small waveforms to the coil, such that the amount of power used for emitting the magnetic signal may be reduced.

An electronic device according to one embodiment of the present disclosure may include: a memory; a coil; a waveform-generating circuit; and a processor, and the processor is configured to: obtain card information stored in the memory; when a first part of the card information is a first value, apply, using the waveform-generating circuit, a first voltage or a first current having a first waveform having a first frequency to the coil, wherein a first tangential slope of a first amplitude of the first waveform for time changes in at least a part of a first interval corresponding to the first part; and when a second part of the card information is a second value, apply, using the waveform-generating circuit, a second voltage or a second current having current second waveform having a second frequency to the coil, wherein the second frequency is twice the first frequency, and a second tangential slope of a second amplitude of the second waveform for time changes in at least a part of a second interval corresponding to the second part.

A control method of an electronic device including a coil according to various embodiments of the present disclosure may include: obtaining card information stored in a memory of the electronic device; when a first part of the card information is a first value, applying a first voltage or a first current having a first waveform having a first frequency to the coil, wherein a first tangential slope of a first amplitude of the first waveform for time changes in at least a part of a first interval corresponding to the first part; and when a second part of the card information is a second value, applying a second voltage or a second current having current second waveform having a second frequency to the coil, wherein the second frequency is twice the first frequency, and a second tangential slope of a second amplitude of the second waveform for time changes in at least a part of a second interval corresponding to the second part.

An electronic device according to various embodiments of the present disclosure may include: a memory; a coil; a waveform-generating circuit; and a processor, and the processor is configured to: obtain card information stored in the memory; when a first part of the card information is a first value, apply, using the waveform-generating circuit, a first voltage or a first current having a first waveform having a first frequency to the coil, wherein a first tangential slope of a first amplitude of the first waveform for time changes in a first interval corresponding to the first part; and when a second part of the card information is a second value, apply, using the waveform-generating circuit, a second voltage or a second current having current second waveform having a second frequency to the coil, wherein the second frequency is higher than the first frequency, and a second tangential slope of a second amplitude of the second waveform for time changes in a second interval corresponding to the second part.

According to various embodiments of the present disclosure, an electronic device and a control method thereof are provided, in which relatively small waveforms are applied to the coil, thereby reducing the amount of power used for transmitting data.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
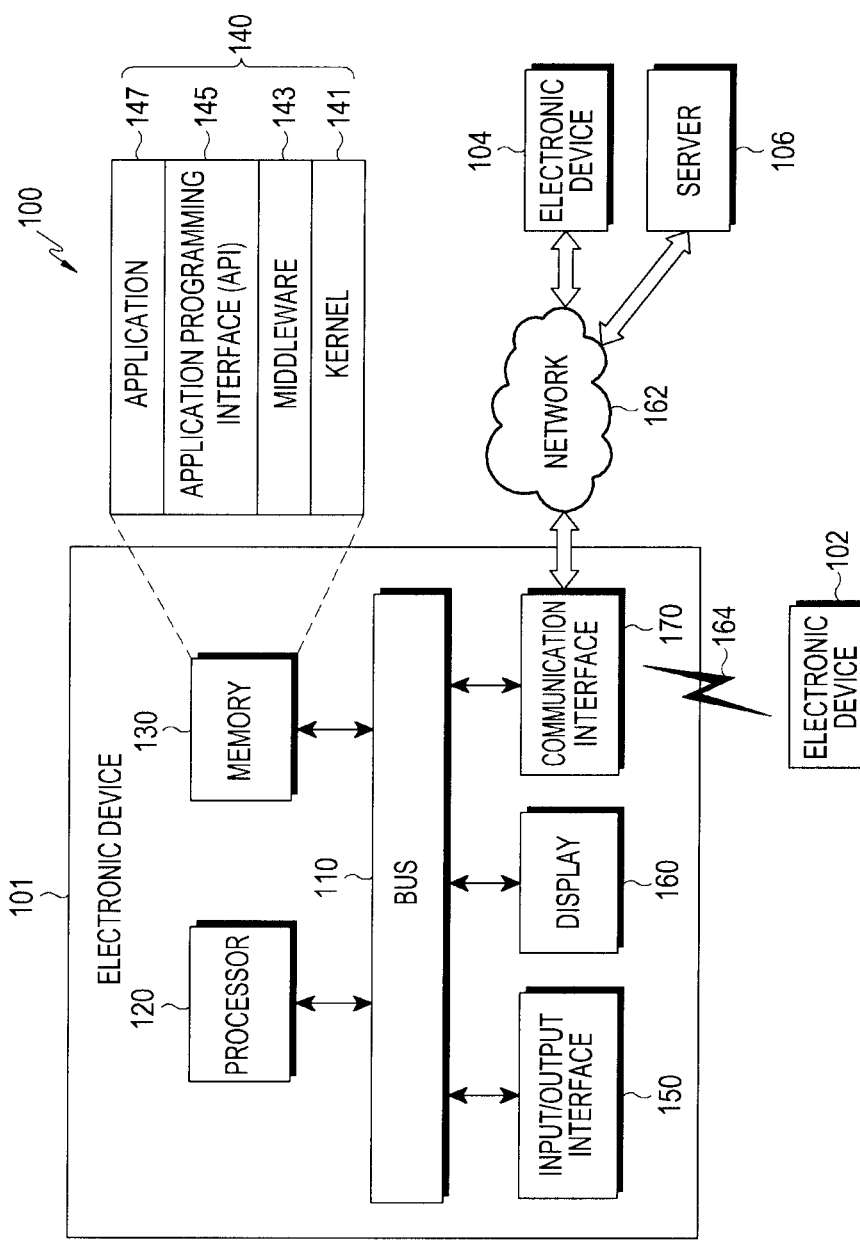
FIG. 1 is a block diagram of an electronic device in a network environment according to one embodiment of the present disclosure.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In the description of the drawings, similar reference numerals may be used to designate similar elements. A singular expression may include the corresponding plural expression unless, in context, the plural expression is definitively excluded. The expressions "a first," "a second," "the first," or "the second" used in the present disclosure may indicate various components regardless of the order and/or the importance and do not limit the corresponding components. It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element). In contrast, when an element (e.g., a first element) is referred to as being "directly coupled with/to" or "directly connected to" another element (e.g., a second element), it should be understood that there are no intervening elements (e.g., a third element).

The expression "configured to" as used in the present disclosure may be interchangeable with, for example, "suitable for," "having the capacity to," "designed to," "adapted to," "made to," or "capable of", depending on the context. Alternatively, in some situations, the expression "device configured to" may mean that the device, together with other devices or components, "is able to." For example, the phrase "processor adapted (or configured) to perform A, B, and C" may mean a dedicated processor (e.g., embedded processor) only for performing the corresponding operations or a generic-purpose processor (e.g., Central Processing unit (CPU) or Application Processor (AP)) that can perform the corresponding operations by executing one or more software programs stored in a memory device.

An electronic device according to various embodiments of the present disclosure may be, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include be an accessory (e.g., a watch, a ring, a bracelet, an anklet, a necklace, a glasses, a contact lens, or a Head-Mounted Device (HMD)), a fabric or clothing integrated device (e.g., an electronic clothing), a body-mounted device (e.g., a skin pad, or tattoo), and a bio-implantable device (e.g., an implantable circuit). In some embodiments, the electronic device may be, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may be various medical devices (e.g., various portable medical measuring devices (a blood glucose monitoring device, a heart rate monitoring device, a blood pressure measuring device, a body temperature measuring device, etc.), a Magnetic Resonance Angiography (MRA) scanner, a Magnetic Resonance Imaging (MRI) scanner, a Computed Tomography (CT) machine, or an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in stores, or internet device of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may be parts of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment of the present disclosure is not limited to the above described devices and may be, without departing from the spirit of the disclosure, include other electronic devices and new electronic devices developed in the art. In the present disclosure, the term "user" may indicate a person using the electronic device or a device (e.g., an artificial intelligence electronic device) using the electronic device.

An electronic device 101 in a network environment 100 according to one embodiment will be described with reference to FIG. 1. The electronic device 101 may include a bus 110, a processor 120, a memory 130, an input/output interface 150, a display 160, and a communication interface 170. In some embodiments, the electronic device 101 may omit at least one of the elements, or may further include other elements. The bus 110 may include, for example, a circuit that interconnects the elements 110 to 170 and delivers communication (e.g., control messages or data) between the elements. The processor 120 may include one or more of a central processing unit, an application processor, and a communication processor (CP). The processor 120, for example, may carry out operations or data processing relating to the control and/or communication of at least one other element of the electronic device 101. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The memory 130 may include a volatile and/or nonvolatile memory. The memory 130 may store, for example, instructions or data relevant to at least one other element of the electronic device 101. According to an embodiment, the memory 130 may store software and/or a program 140. The program 140 may include, for example, kernel 141, middleware 143, application programming interface (API) 145, and/or application programs (or "applications") 147. At least a part of the kernel 141, the middleware 143, or the API 145 may be referred to as an Operating System (OS). The kernel 141 may control or manage system resources (e.g., the bus 110, the processor 120, or the memory 130) used for executing an operation or function implemented by other programs (e.g., the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities to use the system resources (e.g., the bus 110, the processor 120, the memory 130, or the like) of the electronic device 101 to one or more of the application programs 147, and may process the one or more task requests. The API 145 is an interface used by the application 147 to control a function provided from the kernel 141 or the middleware 143, and may include, for example, at least one interface or function (e.g., an instruction) for file control, window control, image processing, character control, or the like. For example, the input/output interface 150 may forward instructions or data, input from a user or an external device, to other element(s) of the electronic device 101, or may output instructions or data, received from other element(s) of the electronic device 101, to the user or the external device.

The display 160 may include, for example, a Liquid Crystal Display (LCD), a Light-Emitting Diode (LED) display, an Organic Light-Emitting Diode (OLED) display, a Micro Electro Mechanical System (MEMS) display, or an electronic paper display. The display 160 may display, for example, various types of content (e.g., text, images, videos, icons, and/or symbols) to the user. The display 160 may include a touchscreen and may receive, for example, a touch input, a gesture input, a proximity input, or a hovering input using an electronic pen or a body part of the user. The communication interface 170 may configure communication, for example, between the electronic device 101 and an external device (e.g., a first external electronic device 102, a second external electronic device 104, or a server 106). For example, the communication interface 170 may be connected to a network 162 through wireless or wired communication to communicate with an external device (e.g., the second external electronic device 104 or the server 106).

The wireless communication may include, for example, cellular communication that uses at least one of LTE, LTE-Advanced (LTE-A), Code Division Multiple Access (CDMA), wideband CDMA (WCDMA), Universal Mobile Telecommunications System (UMTS), Wireless Broadband (WiBro), Global System for Mobile communications (GSM), and the like. According to an embodiment, the wireless communication may include, for example, at least one of Wi-Fi, Bluetooth, Bluetooth Low Energy (BLE), ZigBee, Near Field Communication (NFC), magnetic secure transmission, Radio Frequency (RF), and Body Area Network (BAN). According to an embodiment, the wireless communication may include GNSS. The GNSS may be, for example, the Global Positioning System (GPS), the global navigation satellite system (Glonass), the Beidou navigation satellite system (hereinafter, referred to as "Beidou"), or Galileo (the European global satellite-based navigation system). Hereinafter, in this document, the term "GPS" may be interchangeable with the term "GNSS". The wired communication may employ, for example, Universal Serial Bus (USB), High Definition Multimedia Interface (HDMI), Recommended Standard 232 (RS-232), power line communication, Plain Old Telephone Service (POTS), and the like. The network 162 may include a telecommunications network such as a computer network (e.g., a LAN or a WAN), the Internet, or a telephone network.

Each of the first and second external electronic devices 102 and 104 may be the same as or different from the electronic device 101. According to one embodiment, all or some of the operations executed in the electronic device 101 may be executed in another electronic device or a plurality of electronic devices (e.g., the external electronic devices 102 and 104 or the server 106). According to an embodiment, when the electronic device 101 has to perform some functions or services automatically or in response to a request, the electronic device 101 may make a request for performing at least some of those functions to another device (e.g., the external electronic device 102 or 104 or the server 106) instead of, or in addition to, performing the functions or services by itself. The other electronic device (e.g., the external electronic device 102 or 104, or the server 106) may execute the requested functions, and may deliver the result of execution thereof to the electronic device 101. The electronic device 101 may provide the received result as it is, or may additionally process the received result to provide the requested functions or services. To this end, for example, cloud computing, distributed computing, or client-server computing technology may be used.

According to one embodiment, the processor 120 may be configured to: obtain payment data stored in the memory 130; when a first part of the payment data, e.g. card information is a first value, apply, using the waveform-generating circuit, when a first part of the card information is a first value, apply, using the waveform-generating circuit, a first voltage or a first current having a first waveform having a first frequency to the coil, wherein a first tangential slope of a first amplitude of the first waveform for time changes in at least a part of a first interval corresponding to the first part; and when a second part of the card information is a second value, apply, using the waveform-generating circuit, a second voltage or a second current having current second waveform having a second frequency to the coil, wherein the second frequency is twice the first frequency, and a second tangential slope of a second amplitude of the second waveform for time changes in at least a part of a second interval corresponding to the second part. The processor 120 may also be configured to: obtain payment data stored in the memory; when a first part of the card information is a first value, apply, using the waveform-generating circuit, a first voltage or a first current having a first waveform having a first frequency to the coil, wherein a first tangential slope of a first amplitude of the first waveform for time changes in a first interval corresponding to the first part; and when a second part of the card information is a second value, apply, using the waveform-generating circuit, a second voltage or a second current having current second waveform having a second frequency to the coil, wherein the second frequency is higher than the first frequency, and a second tangential slope of a second amplitude of the second waveform for time changes in a second interval corresponding to the second part.

According to one embodiment of the present disclosure, the waveform-generating circuit may include a plurality of switches connected with the coil, and the processor 120 may be configured to control an on-state or an off-state of each of the plurality of switches to generate the first voltage or the first current, or the second voltage or the second current.

According to one embodiment of the present disclosure, the plurality of switches may include a first switch disposed between one end of the coil and a voltage source that provides a designated voltage; a second switch disposed between other end of the coil and the voltage source; a third switch disposed between the one end of the coil and a ground; and a fourth switch disposed between the other end of the coil and the ground.

According to one embodiment of the present disclosure, the processor 120 may be configured to control the waveform-generating circuit to: keep the second switch and the third switch in off state and periodically switch the first switch and the fourth switch between on state and off state in order to apply positive part of the first voltage or the first current, or positive part of the second voltage or the second current to the coil; and keep the first switch and the fourth switch in off state and periodically switch the second switch and the third switch between on state and off state in order to apply negative part of the first voltage or the first current, or negative part of the second voltage or the second current to the coil.

According to one embodiment of the present disclosure, the processor 120 may be configured to change a period in which the first switch and the fourth switch are in the on-state, a voltage or a current which has positive part of modulated waveform is applied to the coil.

According to one embodiment of the present disclosure, the processor 120 may be configured to change a period in which the second switch and the third switch are in the on-state, a voltage or a current which has negative part of modulated waveform is applied to the coil.

According to one embodiment of the present disclosure, the first voltage or the first current or the second voltage or the second current is a sinusoidal wave, a sawtooth wave, a triangular wave, or a pulse wave.

According to one embodiment of the present disclosure, the processor 120 may be configured to select one of the sinusoidal wave, sawtooth wave, triangular wave, and pulse wave based on an amount of remaining charge of a battery of the electronic device.

According to one embodiment of the present disclosure, the waveform-generating circuit may include a driving circuit for rotating the coil; an N-pole magnet disposed on one side of the coil; and an S-pole magnet disposed on other side of the coil opposite the one side.

According to one embodiment of the present disclosure, the processor 120 may be configured to: rotate the coil at a first speed using the driving circuit in order to generate the first voltage or the first current; and rotate the coil at a second speed using the driving circuit in order to generate the second voltage or the second current.

According to one embodiment of the present disclosure, the waveform-generating circuit includes a digital-to-analog converter (DAC), and the processor 120 is configured to generate the first voltage or the first current or the second voltage or the second current using the DAC.

According to one embodiment of the present disclosure, the second frequency may be an integer multiple of the first frequency.

Figure 2:
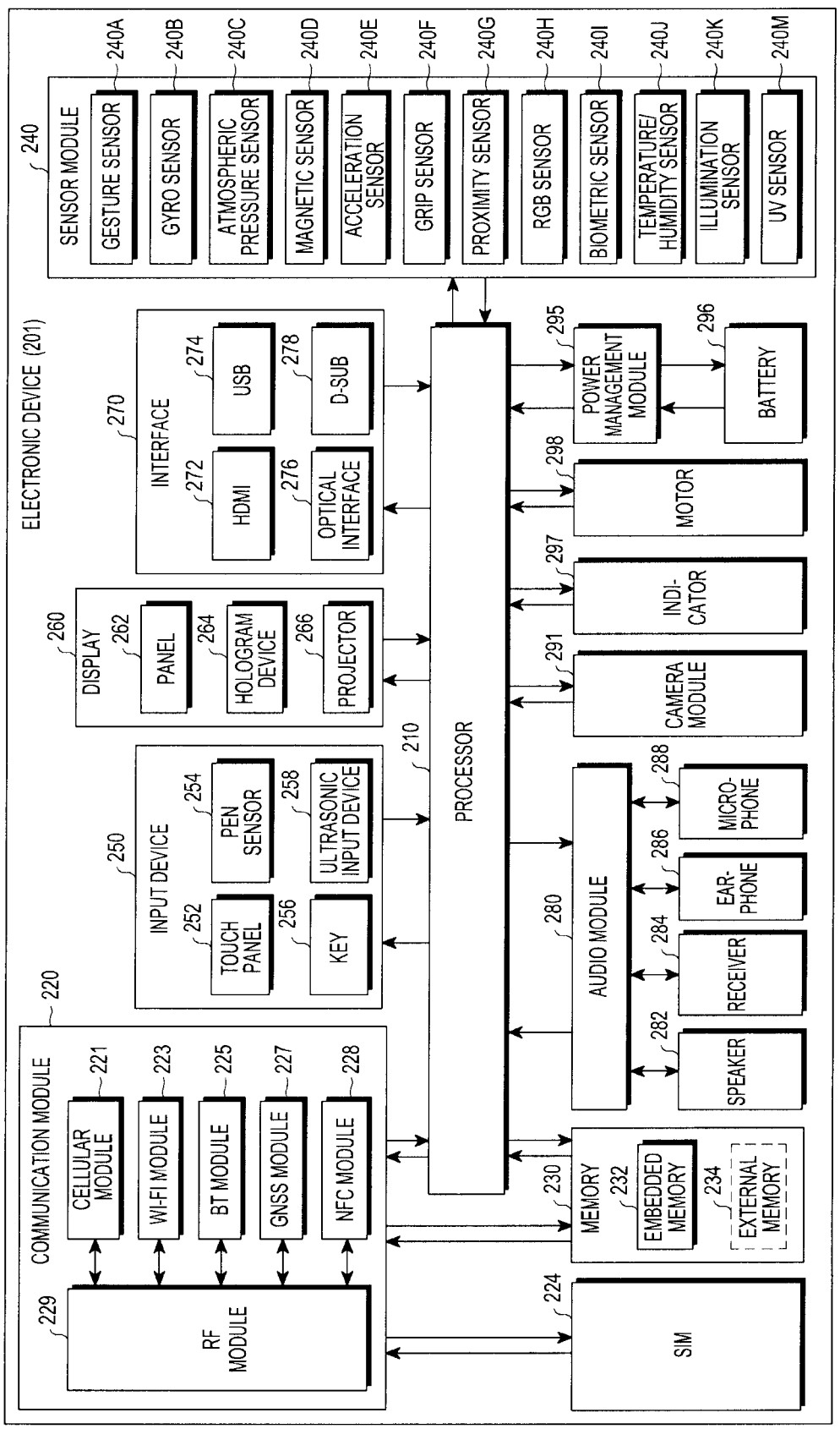
FIG. 2 is a block diagram of an electronic device according to one embodiment of the present disclosure.

FIG. 2 is a block diagram of an electronic device 201 according to one embodiment. The electronic device 201 may include, for example, the whole or a part of the electronic device 101 illustrated in FIG. 1. The electronic device 201 may include at least one processor 210 (e.g., an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected thereto and may perform various data processing and operations by driving an operating system or an application program. The processor 210 may be implemented by, for example, a System on Chip (SoC). According to an embodiment, the processor 210 may further include a Graphic Processing Unit (GPU) and/or an image signal processor. The processor 210 may also include at least some of the elements illustrated in FIG. 2 (e.g., a cellular module 221). The processor 210 may load, in a volatile memory, instructions or data received from at least one of the other elements (e.g., a non-volatile memory), process the loaded instructions or data, and store the result data in a non-volatile memory.

The communication module 220 may have a configuration that is the same as or similar to that of the communication interface 170. The communication module 220 may include, for example, a cellular module 221, a Wi-Fi module 223, a Bluetooth module 225, a GNSS module 227, an NFC module 228, and an RF module 229. The cellular module 221 may provide, for example, voice calls, video calls, text message services, Internet services, or the like through a communication network. According to an embodiment, the cellular module 221 may identify and authenticate the electronic device 201 within the communication network using the subscriber identification module 224 (e.g., a SIM card). According to an embodiment, the cellular module 221 may perform at least some of the functions that the processor 210 may provide. According to an embodiment, the cellular module 221 may include a communication processor (CP). According to some embodiments, at least some (e.g., two or more) of the cellular module 221, the Wi-Fi module 223, the BT module 225, the GNSS module 227, and the NFC module 228 may be included in one Integrated Chip (IC) or IC package. The RF module 229 may transmit/receive, for example, a communication signal (e.g., an RF signal). The RF module 229 may include, for example, transceivers, power amp modules (PAM), frequency filters, low noise amplifiers (LNA), antennas, or the like. According to another embodiment, at least one of the cellular module 221, the Wi-Fi module 223, the BT module 225, the GNSS module 227, and the NFC module 228 may transmit/receive the RF signal through a separate RF module. The subscriber identification module 224 may be, for example, a card that includes a subscriber identification module, or an embedded SIM, and may contain unique identification information (e.g., an integrated circuit card identifier (ICCID)) or subscriber information (e.g., an international mobile subscriber identity (IMSI)).

The memory 230 (e.g., the memory 130) may include, for example, an embedded memory 232 or an external memory 234. The embedded memory 232 may be a volatile memory (e.g., a DRAM, an SRAM, an SDRAM, or the like) or a non-volatile memory (e.g., a one-time programmable ROM (OTPROM), a PROM, an EPROM, an EEPROM, a mask ROM, a flash ROM, a flash memory, a hard disc drive, or a solid state drive (SSD)). The external memory 234 may be a flash drive, for example, a Compact Flash (CF), a Secure Digital (SD), a Micro-SD, a Mini-SD, an eXtreme digital (xD), a Multimedia Card (MMC), a memory stick, or the like. The external memory 234 may be functionally and/or physically connected to the electronic device 201 through various interfaces.

The sensor module 240 may, for example, measure a physical quantity or detect the operating state of the electronic device 201, and may convert the measured or detected information into an electrical signal. The sensor module 240 may include, for example, at least one of the gesture sensor 240A, the gyro sensor 240B, the atmospheric pressure sensor 240C, the magnetic sensor 240D, the acceleration sensor 240E, the grip sensor 240F, the proximity sensor 240G, the color sensor 240H (e.g., a Red, Green, and Blue (RGB) sensor), the biometric sensor 240I, the temperature/humidity sensor 240J, the illumination sensor 240K, and the ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use capacitive, resistive, infrared, or ultrasonic detecting methods. Furthermore, the touch panel 252 may further include a control circuit. The touch panel 252 may further include a tactile layer to provide tactile feedback to the user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (e.g., a microphone 288) to identify data corresponding to the detected ultrasonic waves.

The display 260 (e.g., the display 160) may include the panel 262, the hologram device 264, the projector 266, and/or a control circuit for controlling them. The panel 262 may be implemented to be, for example, flexible, transparent, or wearable. The panel 262, together with the touch panel 252, may be configured as one or more modules. According to an embodiment, the panel 262 may include a pressure sensor (or a force sensor) which may measure the strength of pressure of a user's touch. The pressure sensor may be embodied as an entity integrated with the touch panel 252, or may be embodied as one or more sensors separated from the touch panel 252. The hologram device 264 may show a three-dimensional image in the air using light interference. The projector 266 may display an image by projecting light onto a screen. The screen may be located, for example, in the interior of, or on the exterior of, the electronic device 201. The interface 270 may include, for example, HDMI 272, USB 274, optical 276, or D-subminiature (D-sub) 278 interfaces. The interface 270 may be included in, for example, the communication interface 170 illustrated in FIG. 1. Additionally or alternatively, the interface 270 may, for example, include a Mobile High-definition Link (MHL) interface, a Secure Digital (SD) card/Multimedia Card (MMC) interface, or an infrared data association (IrDA) standard interface.

The audio module 280, for example, may convert sound into electrical signals, and vice versa. At least some elements of the audio module 280 may be included, for example, in the input/output interface 150 illustrated in FIG. 1. The audio module 280 may process sound information that is input or output through, for example, the speaker 282, the receiver 284, the earphones 286, the microphone 288, or the like. The camera module 291 is a device that can photograph a still image and a moving image. According to an embodiment, the camera module 291 may include one or more image sensors (e.g., a front sensor or a rear sensor), a lens, an image signal processor (ISP), or a flash (e.g., an LED or xenon lamp). The power management module 295 may manage, for example, the power of the electronic device 201. According to an embodiment, the power management module 295 may include a Power Management Integrated Circuit (PMIC), a charger IC, or a battery or fuel gauge. The PMIC may employ wired and/or wireless charging. The wireless charging method may employ, for example, magnetic resonance charging, magnetic induction charging, electromagnetic wave charging, and the like. Additional circuits (e.g., coil loops, resonance circuits, rectifiers, and the like) for wireless charging may be further included. The battery gauge may measure, for example, the amount of remaining power of the battery 296 and the voltage, current, or temperature while charging. The battery 296 may include, for example, a rechargeable battery and/or a solar cell.

The indicator 297 may display a particular state of the electronic device 201, such as states when the electronic device 201 is booting, transmitting/receiving a message, charging, or the like. The motor 298 may convert an electric signal into a mechanical vibration, and may generate vibration, haptic feedback, etc. The electronic device 201 may include a mobile TV support device that can process media data according to a standard such as Digital Multimedia Broadcasting (DMB), Digital Video Broadcasting (DVB), mediaFlo™, and the like. Each of the above-described elements described in the present disclosure may be configured with one or more components, and the names of the corresponding elements may vary based on the types of electronic devices. In various embodiments, an electronic device (e.g., the electronic device 201) may omit some elements, or may further include additional elements, or some of the elements of the electronic device may be combined with each other to configure one entity, in which case the entity may identically perform the functions of the corresponding elements prior to the combination thereof.

Figure 3:
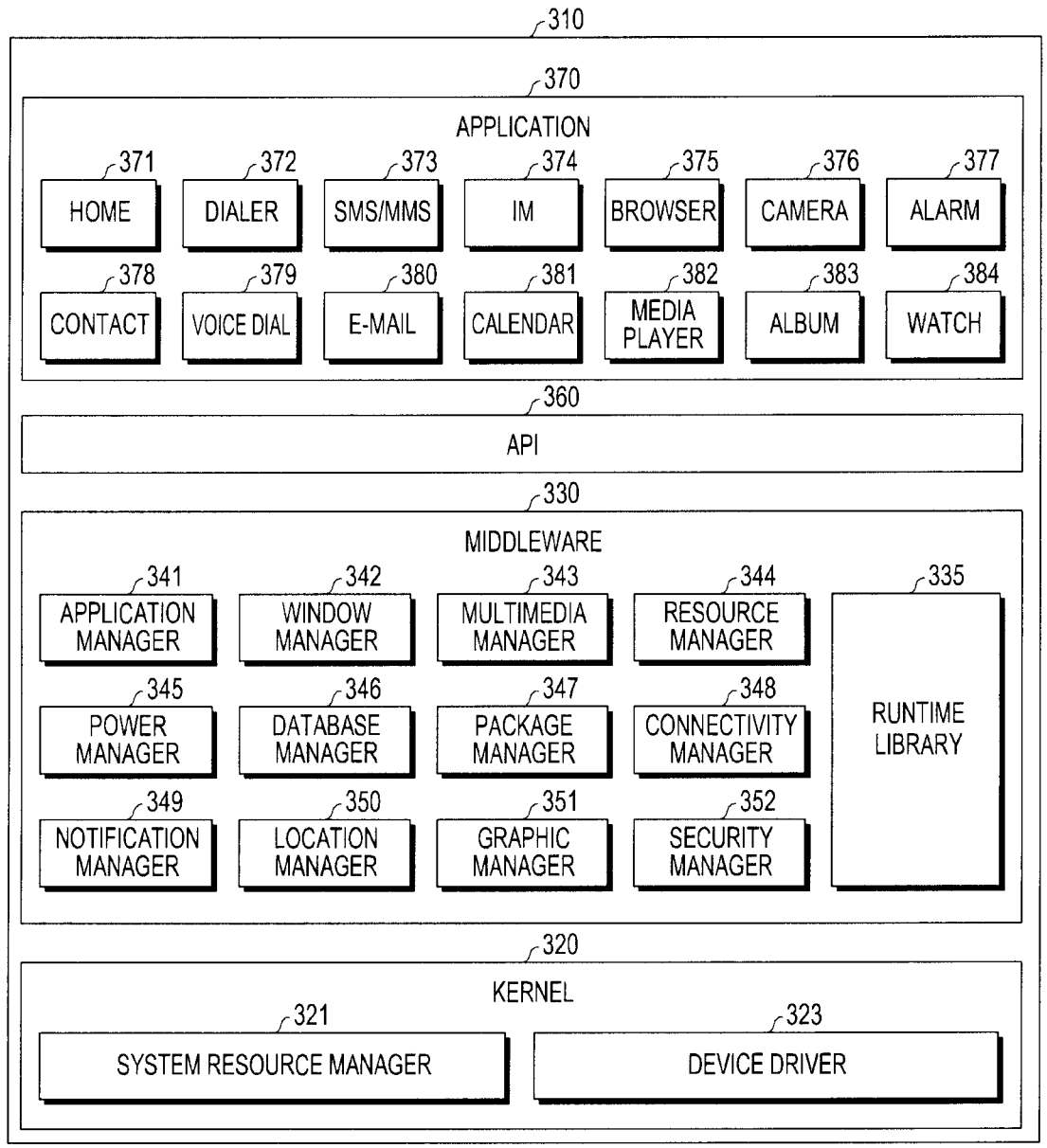
FIG. 3 is a block diagram of a program module according to one embodiment of the present disclosure.

FIG. 3 is a block diagram of a program module according to one embodiment. According to an embodiment, the program module 310 (e.g., the program 140) may include an Operating System (OS) that controls resources relating to the corresponding electronic device (e.g., the electronic device 101) and/or various applications (e.g., the application programs 147) that are driven on the operating system. The operating system may include, for example, Android™, iOS™, Windows™, Symbian™, Tizen™, or Bada™. Referring to FIG. 3, the program module 310 may include the kernel 320 (e.g., the kernel 141), the middleware 330 (e.g., the middleware 143), the API 360 (e.g., the API 145), and/or applications 370 (e.g., the application programs 147). At least a part of the program module 310 may be preloaded on the electronic device, or may be downloaded from an external electronic device (e.g., the external electronic device 102 or 104 or the server 106).

The kernel 320 may include, for example, the system resource manager 321 and/or the device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. The middleware 330 may provide, for example, functions that the applications 370 need in common, or may provide various functions to the applications 370 through the API 360 such that the applications 370 can efficiently use the limited system resources within the electronic device. According to an embodiment, the middleware 330 may include at least one of the runtime library 335, the application manager 341, the window manager 342, the multimedia manager 343, the resource manager 344, the power manager 345, the database manager 346, the package manager 347, the connectivity manager 348, the notification manager 349, the location manager 350, the graphic manager 351, and the security manager 352.

The runtime library 335 may include, for example, a library module that a compiler uses in order to generate new functions while the applications 370 are being executed. The runtime library 335 may manage input/output, manage a memory, or process arithmetic functions. The application manager 341 may manage, for example, the life cycles of the applications 370. The window manager 342 may manage GUI resources used for screens displayed by the electronic device. The multimedia manager 343 may recognize formats required for reproducing various media files, and may encode or decode the media files using codecs suitable for the corresponding formats of the media files. The resource manager 344 may manage the source code of the applications 370 or space in memory. The power manager 345 may manage, for example, the capacity or power of a battery, and may provide power information required for operating an electronic device. According to an embodiment, the power manager 345 may interoperate with the basic input/output system (BIOS). The database manager 346 may, for example, generate, search, or change databases to be used by the applications 370. The package manager 347 may manage the installation or updates of applications that are distributed in the form of a package file.

The connectivity manager 348 may manage, for example, wireless connections. The notification manager 349 may provide an event (e.g., a received message, an appointment, a proximity notification, and the like) to a user. The location manager 350 may manage, for example, the location information of the electronic device. The graphic manager 351 may manage graphic effects, which are provided to the user, or user interfaces related to the graphic effect. The security manager 352 may provide, for example, system security or user authentication. According to an embodiment, the middleware 330 may include a telephony manager for managing the voice or video call function of the electronic device or a middleware module that is capable of performing a combination of the functions of the above-described elements. According to an embodiment, the middleware 330 may include a module specialized for each type of operation systems. Also, the middleware 330 may dynamically delete some of the existing elements, or may add new elements. The API 360 is, for example, a set of API programming functions, which may vary depending on the operating system. For example, in the case of Android, one API suitable for Android may be provided. But when the OS is Tizen, two or more API sets may be provided.

The applications 370 may include applications such as home 371, dialer 372, SMS/MMS 373, Instant Messaging (IM) 374, browser 375, camera 376, alarm 377, contacts 378, voice dialer 379, e-mail 380, calendar 381, media player 382, album 383, watch 384, health care (e.g., for measuring exercise quantity undertaken by the user or blood glucose of the user), environment information (e.g., for measuring atmospheric pressure, humidity, or temperature), and the like. According to an embodiment, the applications 370 may include an information exchange application that can support the exchange of information between the electronic device and an external electronic device. The information exchange application may include, for example, a notification relay application for relaying predetermined information to the external electronic device, or a device management application for managing the external electronic device. For example, the notification relay application may relay notification information generated in applications of the electronic device to the external electronic device, or may receive notification information from the external electronic device and provide the received notification information to the user. The device management application may install, delete, or update the functions of the external electronic device that communicates with the electronic device (e.g., turning on/off a portion or all of the external electronic device or adjusting the brightness (or resolution) of the display of the external electronic device) or applications executed in the external electronic device. According to an embodiment, the applications 370 may include applications (e.g., a health care application of a mobile medical appliance) that are designated according to the attributes of the external electronic device. According to an embodiment, the applications 370 may include applications received from the external electronic device. At least some of the program module 310 may be implemented in software, firmware, hardware (e.g., the processor 210), or a combination of two or more thereof, and may include modules, programs, routines, instruction sets, or processes for performing one or more functions.

The term "module" as used herein may include a unit consisting of hardware, software, or firmware, and may, for example, be used interchangeably with the term "logic," "logical block," "component," "circuit," or the like. The "module" may be an integrated component. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by instructions which are stored a computer-readable storage medium (e.g., the memory 130) in the form of a program module. The instructions, when executed by a processor (e.g., the processor 120), may cause the one or more processors to execute the functions corresponding to the instructions. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instructions may include code which is made by a compiler or code which may be executed by an interpreter. The programming module according to the present disclosure may include one or more of the aforementioned components or may further include other additional components, or some of the aforementioned components may be omitted. Operations performed by modules, programming modules, or other elements according to various embodiments may be executed sequentially, in parallel, repeatedly, or in a heuristic manner. At least some operations disclosed herein may have their orders altered, may be omitted, or may further include other operations.

Figure 4A:
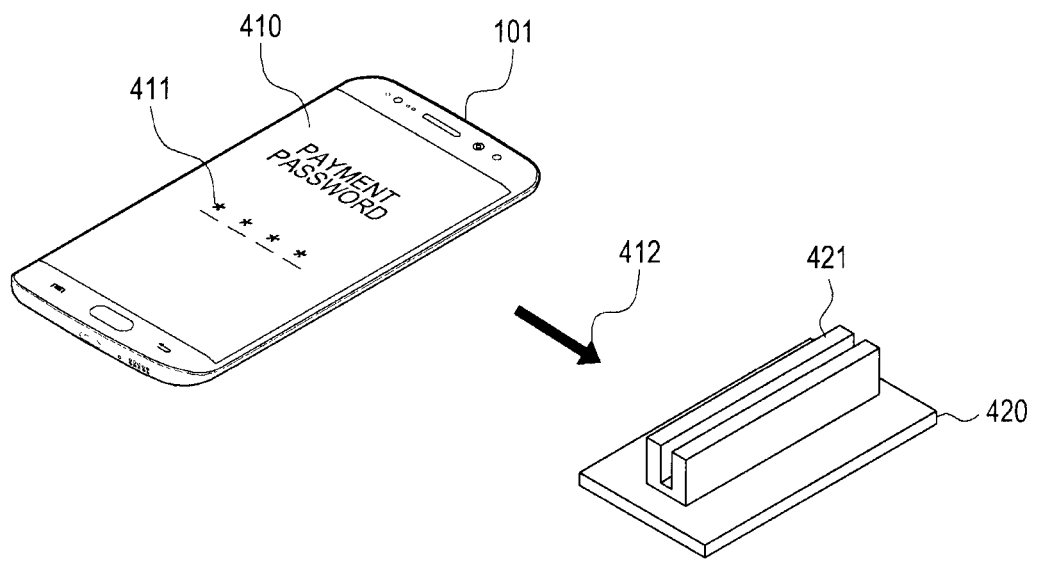
FIG. 4A is a perspective view of an electronic device and a data reception device according to one embodiment of the present disclosure.

FIG. 4A is a perspective view of an electronic device and a data reception device according to one embodiment of the present disclosure.

The electronic device 101 may execute an electronic payment application, and may display an execution screen 410 of the electronic payment application. Hereinafter, the expression "the electronic device 101 performs a predetermined operation" may indicate that the processor 120 included in the electronic device 101 performs the predetermined operation. Alternatively, the expression "the electronic device 101 performs a predetermined operation" may indicate that the processor 120 controls another piece of hardware to perform the predetermined operation. According to one embodiment of the present disclosure, the execution screen 410 of the electronic payment application may include an input window 411 where the user may enter his or her password. Although not illustrated, the electronic device 101 may display a keyboard including a plurality of character keys on a portion of the display. The user may input his or her password by touching keys in the keyboard, and the electronic device 101 may identify keys corresponding to points where the touches are detected. For security, the specific characters of the password may not be displayed in the input window 411. Rather, as shown, a security character such as an asterisk may be displayed instead. The electronic device 101 may compare the obtained password with the record of the password previously stored in memory. When the obtained password is identical to the previously stored password, the electronic device 101 may emit a magnetic signal corresponding to payment data.

Although FIG. 4A illustrates that the electronic device 101 transmits payment data based on the password input by the user, this is merely for illustrative purposes, and the electronic device 101 may perform other authentication procedure using various pieces of user biometric information, such as fingerprint recognition, iris recognition, and the like. Alternatively, the electronic device 101 may perform a multi-factor authentication procedure which uses both a user input and user biometric information. When authentication is completed, the electronic device 101 may emit the magnetic signal.

The electronic device 101 may generate and emit a magnetic field 412 which corresponds to payment data. The magnetic field 412 may change over time. Here, the magnetic field 412 may be referred to as a magnetic signal. The electronic device 101 may include a coil that generates an induced magnetic field. Thus, by applying a current corresponding to the payment data, the electronic device 101 may generate and emit a magnetic field corresponding to payment data. Correspondingly the data reception device 420 may include the read header 421. The read header 421 may include a coil, which is capable of generating an induced electromotive force from the surrounding magnetic field, such as the magnetic field 412. The data reception device 420 may process and interpret the induced electromotive force, and may obtain payment data stored in the electronic device 101 using the interpreted result. The data reception device 420 may determine whether payment data is identical to previously stored payment data, and may determine whether to approve the payment based on whether they are identical. Alternatively, the data reception device 420 may transmit interpreted payment data to another external electronic device, and the external electronic device may determine whether payment data previously stored in the external electronic device and payment data received from the data reception device 420 are identical. If so, the external electronic device may determine to approve the payment. If approved, the external electronic device may process with payment, and may indicate, to the data reception device 420, that the payment was approved. Upon receiving the approval, the data reception device 420 may output a receipt. But if the external electronic device does not approve the payment, for example when the payment data from the electronic device does not match previously stored payment data, the data reception device 420 may output a payment failure report.

Figure 4B:
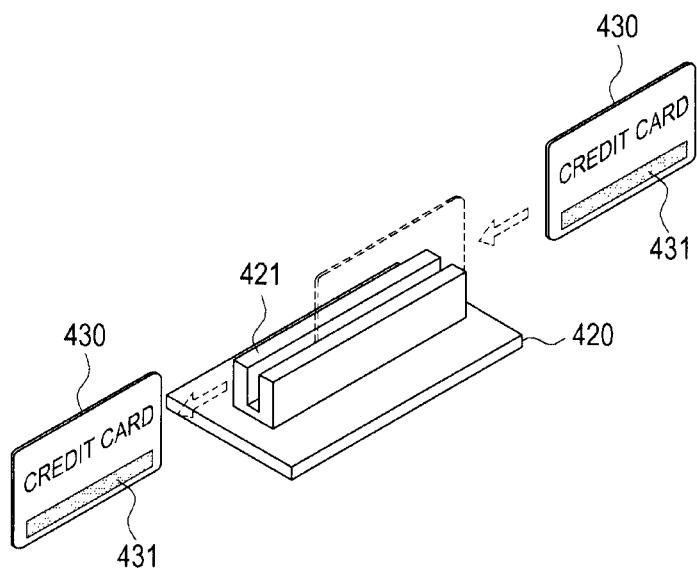
FIG. 4B is a perspective view illustrating payment using a magnetic stripe credit card.

For comparison with the prior art, FIG. 4B is a perspective view illustrating payment using a magnetic stripe credit card, which is known in the art. The data reception device 420 of FIG. 4B may be the same as that of FIG. 4A. In FIG. 4B, the credit card 430 may include a magnetic substance 431. The magnetic substance 431 may include a plurality of magnetic dipoles. The plurality of magnetic dipoles may be arranged based on unique payment data assigned to the credit card 430. For example, the payment data may be binary data. A dipole having a first length may correspond to the "0" of the binary data. A dipole having a second length may correspond to the "1" of the binary data. As illustrated in FIG. 4B, after being inserted into the recess defined in the read header 421, the credit card 430 may be swiped by the user. The movement of the magnetic substance 431 may cause a change in the magnetic field which induces electromotive force in the coil of the read header 421. The data reception device 420 may process and interpret the induced electromotive force, and may determine whether to approve the payment using the interpreted result, or may transmit the interpreted result to another external electronic device for approval.

As described above, the electronic device 101 of FIG. 4A may generate a magnetic field 412 that is the substantially the same as the magnetic field generated by the swipe of the magnetic substance 431 in the recess of the data reception device 420, thereby transmitting payment data without the need of a credit card. Alternatively, the electronic device 101 according to one or more embodiments of the present disclosure may generate a magnetic field 412 that is different from the magnetic field generated by the swipe of the magnetic substance 431. For example, the data reception device 420 may detect a peak in the waveform of the obtained induced electromotive force. In this instance, the electronic device 101 may generate a low-power magnetic field 412 for generating the peak, to enable the data reception device 420 to detect the peak. The electronic device 101 may apply, to its coil, various types of currents having relatively small magnitudes, such as sinusoidal waves, sawtooth waves, triangular waves, pulse waves, or the like, instead of applying currents having a relatively large magnitudes, such as square waves. The electronic device 101 may adjust the waveform applied to the coil, in order to generate the magnetic field 412 from which the data reception device 420 will detect the peak, which will be described in detail. As described above, when the magnetic field is generated by a current with a waveform having a relatively smaller magnitude than that of square waves, low-power payment data transmission may be realized.

Hereinafter, payment data transmission by a stripe of a credit card and a magnetic field generated by an electronic device will be described in detail.

Figure 5:
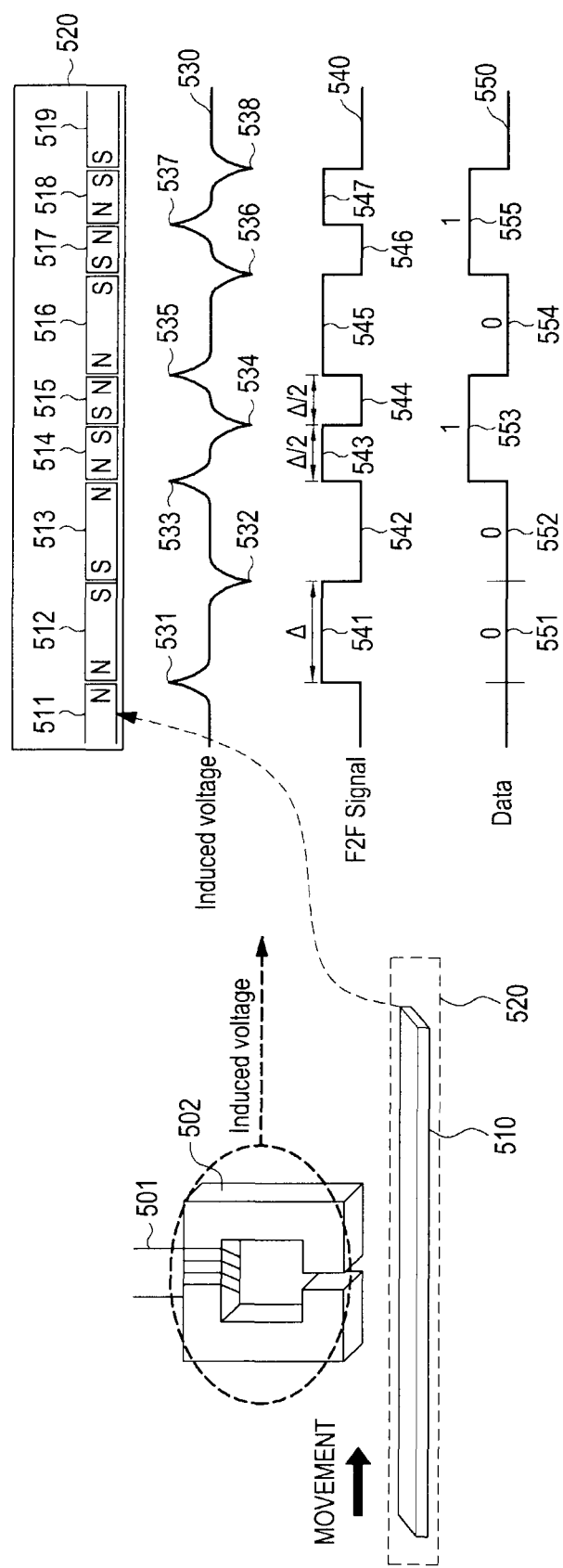
FIG. 5 is a perspective view of a coil and a magnetic stripe of the credit card and graphs of various types of waveforms, which correspond to the magnetic stripe of the credit card.

FIG. 5 is a perspective view of a coil and a magnetic stripe of a credit card and graphs of various types of waveforms, which correspond to the magnetic stripe of the credit card. As illustrated in FIG. 5, a plurality of magnetic poles 511 to 519 may be arranged on the magnetic substance 510 of the credit card 520. For example, the payment data assigned to the credit card 520 may be binary data "00101." Magnetic dipoles 512, 513, and 516 having a first length may correspond to the binary "0." Magnetic dipoles 514, 515, 517, and 518 having a second length may correspond to the binary "1." Here, the first length may be, for example, two times the second length. Neighboring magnetic dipoles may be arranged such that the same poles are adjacent to each other. For example, as shown in FIG. 5, the S pole of the second magnetic dipole 512 may be disposed adjacent to the S pole of the neighboring third magnetic dipole 513. Likewise, the N pole of the third magnetic dipole 513 may be disposed adjacent to the N pole of the neighboring fourth magnetic dipole 514.

When the magnetic substance 510 is swiped, an induced voltage may be generated by the coil 501 included in the data reception device 420. The coil 501 may be wound around a ferrite 502 to increase the magnetic flux. The induced voltage 530 may include a plurality of peaks 531 to 538. For example, when the N-pole approaches the coil 501, positive peaks 531, 533, 535, and 537 may be induced. When the S-pole approaches the coil 501, negative peaks 532, 534, 536, and 538 may be induced. The data reception device 420 may perform frequency/double frequency (F2F) encoding/decoding based on the distance between peaks. The F2F encoding/decoding may associate a first frequency with the binary "0," and may associate a second frequency, which is double the first frequency, with the binary "1." The data reception device 420 may obtain an F2F signal 540 based on the distances between neighboring peaks in the induced voltage 530. For example, an F2F signal may include intervals 541, 542, and 545, which last for a first time duration, and intervals 543, 544, 546, and 547, which last for a second time duration. The data reception device 420 may interpret the intervals 541, 542, and 545 as binary data "0"s 551, 552, and 554, and may interpret the intervals 542, 544, 546, and 547 as binary data "1"s 553 and 555. Therefore, the data reception device 420 may obtain the binary string of "00101." According to various embodiments of the present disclosure, the electronic device 101 may apply, to its coil, currents with various types of low-power waveforms, which will enable the data reception device 420 to similarly detect peaks 531 to 538, so that the data reception device 420 can also obtain the string "00101" from the electronic device 101.

Figure 6:
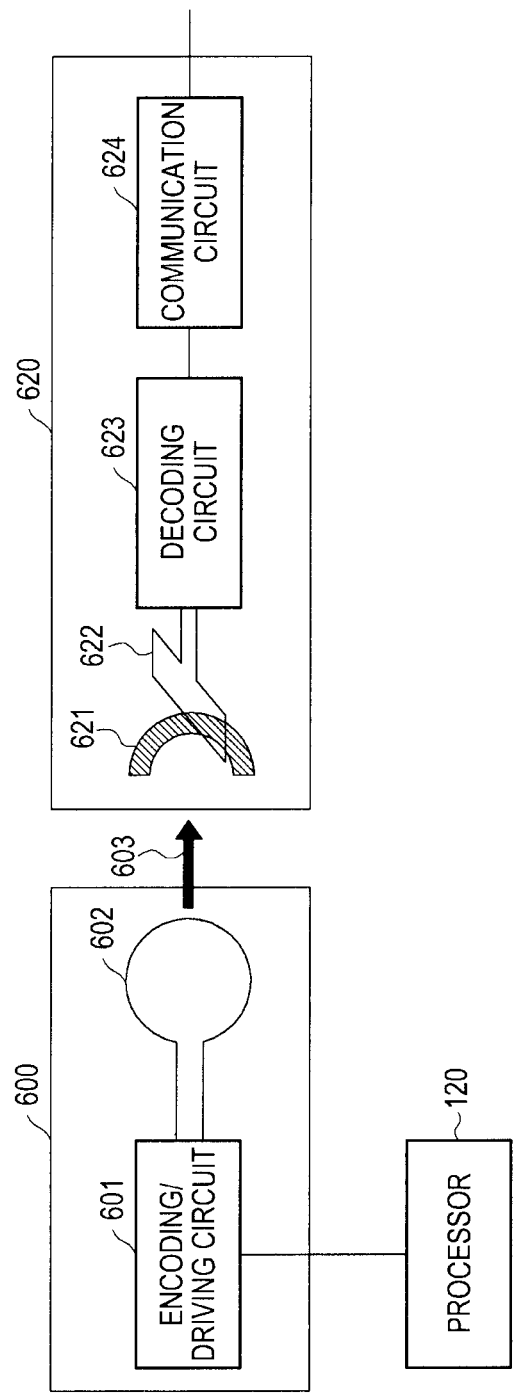
FIG. 6 is a block diagram illustrating a data transmission circuit according to one embodiment of the present disclosure.

FIG. 6 is a block diagram illustrating a data transmission circuit according to one embodiment of the present disclosure.

A data transmission circuit 600 may be included in the electronic device 101, or may be connected to the electronic device 101 via a wired or wireless connection. The data transmission circuit 600 may include an encoding/driving circuit 601 and a coil 602. The processor 120 may provide, for example, payment data stored in the memory 130 to the encoding/driving circuit 601. In doing so, the processor 120 may execute a payment application, and when a predetermined authentication process is completed, may provide payment data to the encoding/driving circuit 601. The encoding/driving circuit 601 may encode the received payment data based on a predetermined scheme, for example, the F2F scheme described above. The encoding/driving circuit 601 may generate a waveform to correspond to the payment data using the predetermined encoding scheme. Because the encoding/driving circuit 601 generates the waveform, the encoding/driving circuit 601 may also be referred to as a waveform-generating circuit. The processor 120 may provide payment data in the form of binary data to the encoding/driving circuit 601.

The encoding/driving circuit 601 according to one embodiment of the present disclosure may generate a current having a sinusoidal waveform corresponding to payment data. For example, a sinusoidal wave having a first frequency may be generated for the binary "0" and a sinusoidal wave having a second frequency may be generated for the binary "1." Various embodiments of the encoding/driving circuit 601 will be described in detail. A current output from the encoding/driving circuit 601 may be transferred to the coil 602. The coil 602 may generate an induced magnetic field 603 using the current, thereby emitting a magnetic signal. The magnitude of sinusoidal-wave current applied to the coil 602 may change over time, and in turn causes changes in the induced magnetic field 603. The type of coil 602 may be spiral, solenoid, toroidal, etc. The encoding/driving circuit 601 according to one embodiment of the present disclosure may include an amplifier for amplifying signal output from the encoding/driving circuit 601.

The strength of the induced magnetic field 603 may change over time. As the induced magnetic field 603 changes over time, electromotive force may be induced in a coil 622 of a data reception device 620. The coil 622 may be wound around a ferrite 621 to increase the magnetic flux. The electromotive force induced in the coil 622, which may be detected as voltages, may be decoded by a decoding circuit 623. For example, the decoding circuit 623 may detect peaks in the induced electromotive force, and may interpret data according to the intervals between peaks. When the intervals between peaks has a first time duration, the decoding circuit 623 may interpret them as the binary "0." When the intervals between peaks has a second time duration, the decoding circuit 623 may interpret them as the binary "1."

A communication circuit 624 may transmit the result of decoding to another external electronic device via a wired or wireless connection. The external electronic device may determine whether payment is successfully performed or fails, and may return a payment success report or a payment failure report to the data reception device 620. The data reception device 620 may output the payment success report or payment failure report. According to another embodiment, the data reception device 620 may include a processor, and the processor may determine whether the payment is successfully performed or fails based on the result of decoding. As described above, the data transmission circuit 600 according to one embodiment of the present disclosure applies, to the coil 602, a current having a relatively small magnitude, such as sinusoidal waves, so that relatively low power may be used for emitting the magnetic signal. Thus, when a relatively small amount of charge remains in the battery of the electronic device, reliable payment data transmission may still be performed. The encoding/driving circuit 601 may apply low-power currents in various waveforms, and those skilled in the art may readily understand that the waveforms are not limited to sinusoidal waves.

According to one embodiment of the present disclosure, the processor 120 may be configured to include the encoding/driving circuit 601. For example, the processor 120 may perform at least some functions that the encoding/driving circuit may provide.

Figure 7:
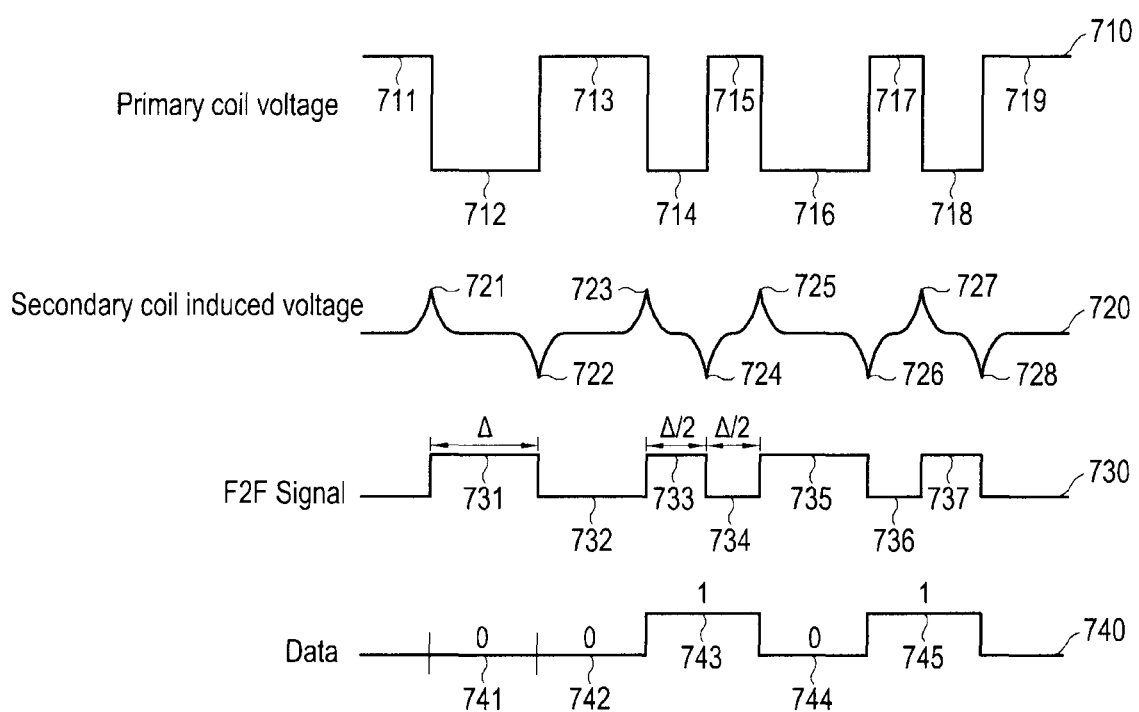
FIG. 7 is graphs illustrating a signal generated using a square wave for purposes of comparison with the present disclosure.

FIG. 7 is graphs illustrating a signal generated using a square wave for purposes of comparison with the present disclosure.

For purposed of comparison, FIG. 7 relates to an electronic device that applies a square-wave voltage 710 to a primary coil, i.e. the coil of the electronic device. The voltage 710 may include high signals 711, 713, 715, 717, and 719, and low signals 712, 714, 716, and 718. The electronic device of the comparative example may set a period for changing from a high signal to a low signal or from a low signal to a high signal to a first period or a second period. For example, the electronic device of the comparative example may change a signal based on the first period with respect to binary data of "0", and may change a signal based on the second period with respect to binary data of "1".

Figure 8A:
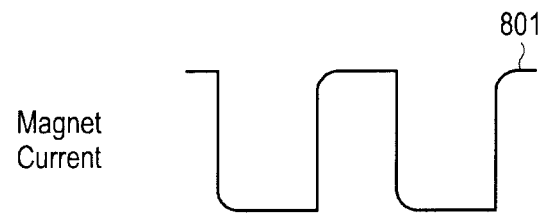
FIG. 8A and FIG. 8B are graphs illustrating a square waveform or a trapezoidal-shaped waveform, according to one or more embodiments of the present disclosure.
Figure 8A:
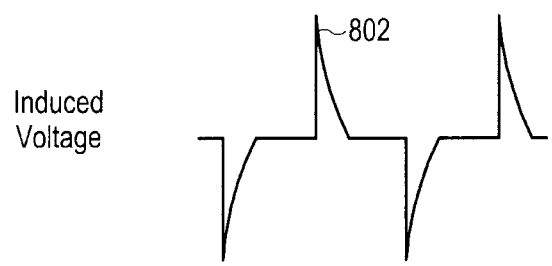
Figure 8B:
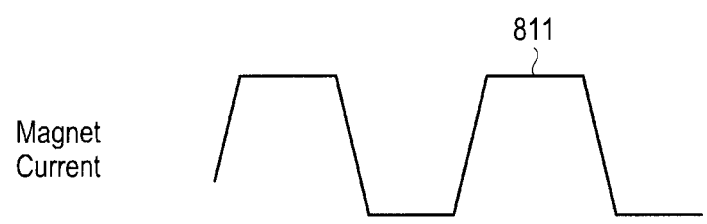
Figure 8B:
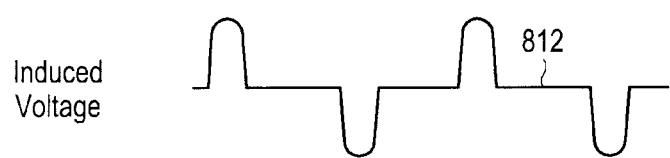

The voltage 720 induced in a secondary coil (i.e. the coil included in the data reception device) may include a plurality of peaks 721 to 728. That is, the electronic device in this comparative example may apply the square-wave voltage 710 to enable a voltage induced from the secondary coil of the data reception device to have peaks. The data reception device may obtain an F2F signal 730. The F2F signal 730 may include a plurality of intervals 731 to 737 based on intervals between peaks 721 to 728. The data reception device may obtain binary data 741 to 745 of "0" or "1" based on the time duration of the intervals in the F2F signal. As shown in FIGS. 8A and 8B, the electronic device in this comparative example may apply, to the primary coil, a voltage or a current having a square waveform or trapezoidal waveform 801 or 811, and a voltage or current 802 or 812 including peaks may be induced in the secondary coil. As described above, the trapezoidal waveform or the square waveform may have relatively large magnitudes, such that relatively large amount of power is required to generate those waveforms.

Figure 9A:
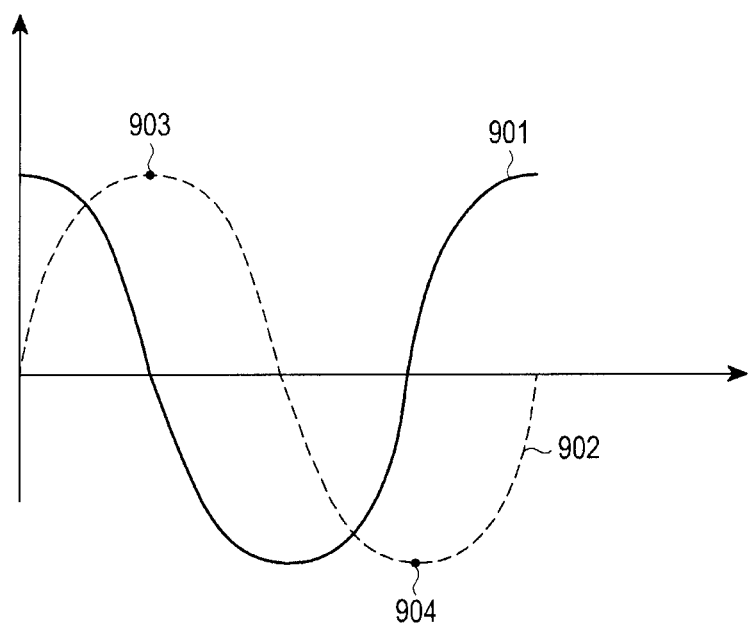
FIG. 9A, FIG. 9B and FIG. 9C are graphs illustrating voltage or current waveforms that are applied to a primary coil of an electronic device according to one embodiment of the present disclosure.

FIG. 9A is a graph illustrating a voltage or current waveform that is applied to a primary coil of an electronic device according to one embodiment of the present disclosure.

The electronic device 101 according to one embodiment of the present disclosure may apply a sinusoidal wave voltage or current 901 to its primary coil. The electronic device 101, for example, may apply the current that conforms to Equation 1 to the primary coil.

$$y = A \cos(2\pi ft) \qquad \text{[Equation 1]}$$

Figure 9B:
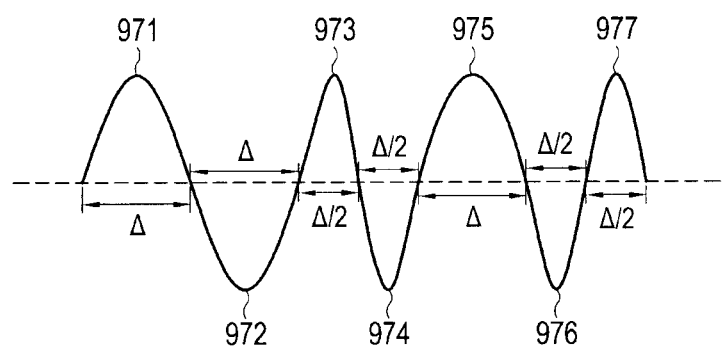

"A" indicates the amplitude of the current applied to the primary coil, and "f" indicates the frequency of current. The electronic device 101 according to one embodiment of the present disclosure may adjust the frequency f according to the binary payment data. For example, to represent payment data of "0", the electronic device 101 may set f to a first frequency. To represent payment data of "1", the electronic device 101 may set f to a second frequency, and the second frequency may be, for example, two times the first frequency. Thus, the electronic device 101 may apply the sinusoidal-wave current shown in FIG. 9B to its primary coil to represent "00101." The electronic device 101 may apply, to the primary coil, the current including sinusoidal waves 971, 972, and 975 of the first frequency, in which binary data of "0" is encoded, and sinusoidal waves 973, 974, 976, and 977 of the second frequency, in which binary data of "1" is encoded. As illustrated in FIG. 9B, the slopes of the sinusoidal waves 971-977 change according to their corresponding frequencies. The electronic device 101 may apply, to the primary coil, current of which an instantaneous slope (i.e., a differential coefficient or tangential slope) of a current (or a voltage) for time changes in at least a part of a designated time. For example, for the sinusoidal wave 971 of the first frequency, the tangential slope gradually decreases during the first half of a first time length (Δ) and arrives at 0. The tangential slope then becomes gradually negative during the latter half of the first time length (Δ). Similarly for the sinusoidal wave 973, its tangential slope gradually decreases during the first half of a second time length (Δ/2) and arrives at 0. The tangential slope then gradually becomes more negative during the latter half of the second time length (Δ/2), but the absolute value of the tangential slope increases. For the sinusoidal wave 974, its tangential slope gradually increases during the first half of the second time length (Δ/2) and arrives at 0, and continues to increase during the latter half of the second time length (Δ/2). As described above, the electronic device 101 according to various embodiments of the present disclosure may apply a current or voltage waveform to its coil, where the tangential slope of the waveform changes over time.

According to another embodiment, the electronic device 101 may apply, to the primary coil, a voltage or a current in a waveform of which an tangential slope from the maximum amplitude (e.g., A) gradually increases from a negative value and arrives at 0 during the first half of the first time length (Δ) of a square wave and of which the tangential slope increases to a positive value during the latter half of the first time length (Δ) and arrives at the maximum amplitude.

Electromotive force 902 having a sinusoidal waveform may be induced in the secondary coil. For example, the induced electromotive force 902 may conform to Equation 2.

$$y' = B \sin(2\pi f t) \quad \text{[Equation 2]}$$

"B" of Equation 2 may indicate the amplitude of induced electromotive force. "f" in the secondary coil may be the same as f in Equation 1. That is, the induced electromotive force may have substantially the same frequency as that of the current or voltage waveform applied to the primary coil. Accordingly, the data reception device including the secondary coil may interpret data based on the time duration between peaks 903 and 904 in the induced electromotive force 902. For example, when the frequency is the first frequency, the time duration between the peaks 903 and 904 may be a first distance. When the frequency is the second frequency, the time duration between the peaks 903 and 904 may be a second distance. The first duration may be two times the second duration. The data reception device may decode data based on the duration between peaks.

Figure 9C:
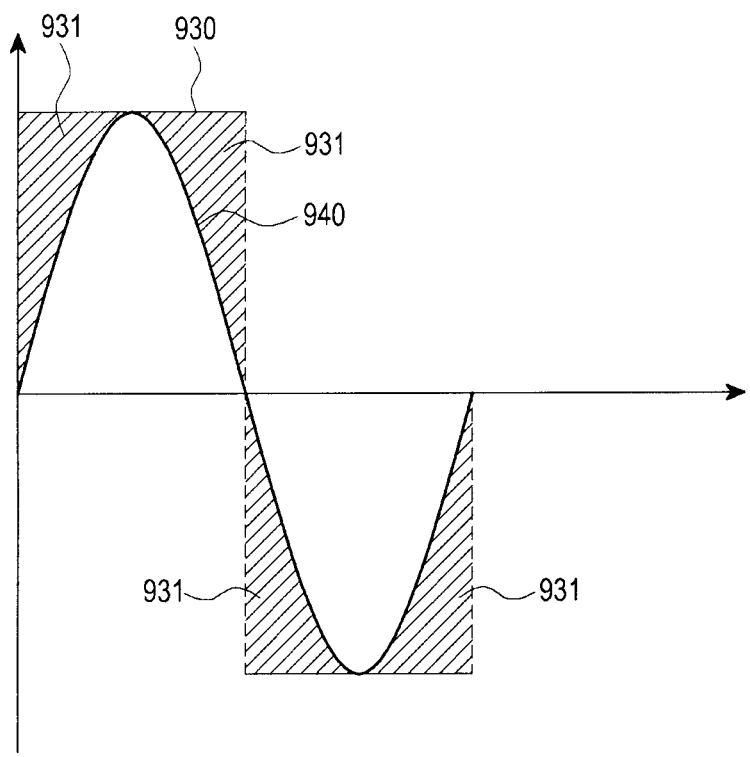

FIG. 9C is a graph for comparing a sinusoidal-wave current according to one embodiment of the present disclosure and a square-wave current according to a comparative example.

As illustrated in FIG. 9C, the square-wave current 930 applied by a comparative electronic device may have a larger magnitude 931 than that of the sinusoidal-wave current 940 applied by an electronic device according to one embodiment of the present disclosure. The sinusoidal-wave current 940 may use 30% less power compared with the square-wave current 930 based on a Root Mean Square (RMS) analysis.

Also, error rates may be reduced when sinusoidal waves are used. For example, square waves are generated by aggregating multiple sinusoidal waves, and entail a high probability of overdamping or underdamping, which may cause errors. In contrast, occurrence of overdamping or underdamping in sinusoidal waves is relatively lower.

Figure 10A:
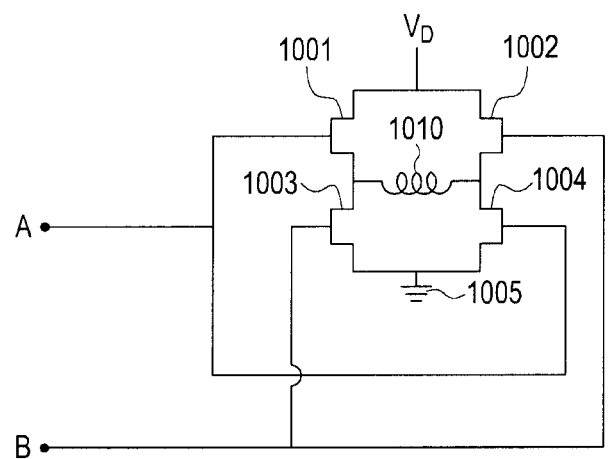
FIG. 10A is a circuit diagram illustrating a circuit of an electronic device which is capable of generating a sinusoidal-wave current according to one embodiment of the present disclosure.

FIG. 10A illustrates an encoding/driving circuit of an electronic device which is capable of generating a sinusoidal-wave current according to one embodiment of the present disclosure.

The electronic device 101 may include the primary coil 1010. The electronic device 101 may apply the sinusoidal-wave current corresponding to payment data to the primary coil 1010. The electronic device 101 may apply the sinusoidal-wave current to the primary coil 1010 by turning on/off of the plurality of switches 1001 to 1004 connected to the primary coil 1010. Each of the first to fourth switches 1001 to 1004 may be connected to the primary coil 1010, and the third switch 1003 and the fourth switch 1004 may be connected to the ground 1005. Driving power of VD may be applied to the first switch 1001 and the second switch 1002.

Figure 10B:
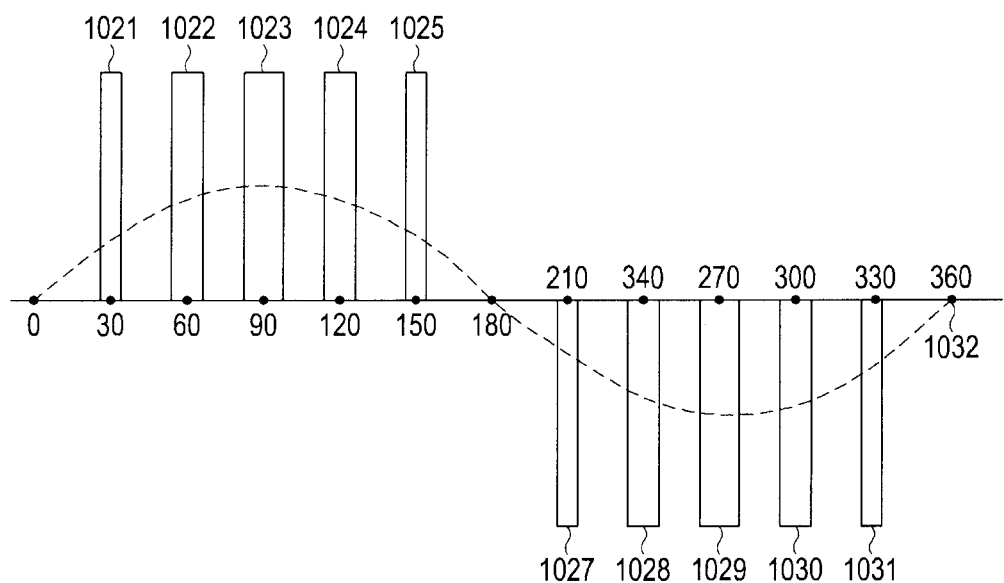
FIG. 10B is a graph illustrating the application of current according to one embodiment of the present disclosure.

FIG. 10B is a graph illustrating the application of a current according to one embodiment of the present disclosure. As shown in FIG. 10B, the electronic device 101 may generate sinusoidal waves based on a pulse width modulation (PWM) scheme. For example, the electronic device 101 controls the first switch 1001 and the fourth switch 1004 to be in the on-state and controls the second switch 1002 and the third switch 1003 to be in the off-state, such that positive-waveform currents 1021 to 1025 are applied to the primary coil 1010. For example, the processor 120 may apply a switch control signal to each of a first input end A and a second input end B, thereby controlling the on/off-state of each of the plurality of switches 1001 to 1004. The first input end A may be connected to the first switch 1001 and the fourth switch 1004, and the second input end B may be connected to the second switch 1002 and the third switch 1003.

The electronic device 101 may control the first switch 1001 and the fourth switch 1004 to be in the off-state, and may control the second switch 1002 and the third switch 1003 to be in the on-state, such that negative-waveform currents 1027 to 1032 are applied to the primary coil 1010. As illustrated in FIG. 10B, the plurality of periods of time during which the positive-waveform current 1021 to 1023 are applied increases and period of time during which the positive-waveform current 1023 to 1025 are applied then decreases. In addition, the plurality of periods of time during which the negative-waveform current 1027 to 1029 are applied may increase and the plurality of periods of time during which the negative-waveform current 1029 to 1031 are applied may then decrease. The electronic device 101 may not apply a current in a predetermined interval, e.g. time gaps between positive-waveform current 1021 to 1025. As described above, the sinusoidal-waveform current may be applied to the primary coil 1010. The electronic device 101 may adjust the period of time in which currents 1021 to 1025 and 1027 to 1032 are applied, by adjusting the period of time in which switch control signals input into the input ends A and B are applied. The frequencies of the sinusoidal wave may be determined based on how long each of the positive-waveform current 1021 to 1025 and the negative-waveform current 1027 to 1032 are applied to the coil 1010.

According to one embodiment of the present disclosure, the electronic device 101 may determine the frequencies of a sinusoidal wave based on payment data, and may control the on/off-state of the plurality of switches 1001 to 1004 to generate the sinusoidal wave of the determined frequencies. For example, when the electronic device 101 generates a sinusoidal wave of the second frequency, which is two times the first frequency, the electronic device 101 may decrease the application time of the currents 1021 to 1025 and 1027 to 1032 and the intervals between the currents 1021 to 1025 and 1027 to 1032 by ½, compared with the case in which the electronic device generates a sinusoidal wave of the first frequency. Instead of applying currents, the electronic device 101 may apply voltages in the waveform of FIG. 10B to the coil.

Figure 10C:
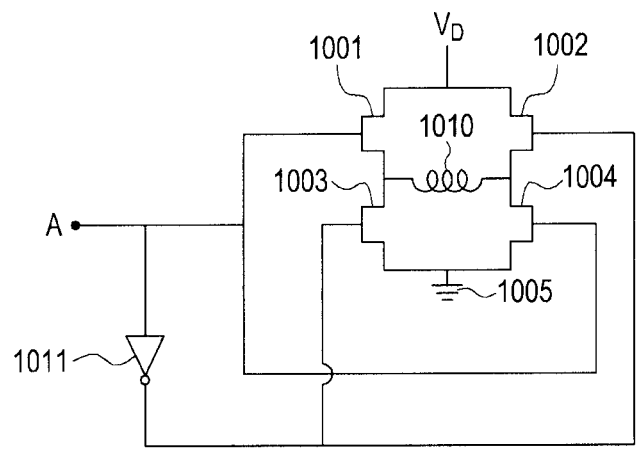
FIG. 10C and FIG. 10D are circuit diagrams of electronic devices according to one or more embodiments of the present disclosure.

FIG. 10C is a circuit diagram of an electronic device according to one embodiment of the present disclosure. Compared with the electronic device of FIG. 10A, the electronic device of FIG. 10C includes a single input end A instead of two input ends. A first path of one input end (A) may be connected with the first switch 1001 and the fourth switch 1004, and an inversion element 1011 for inverting a signal may be disposed in the second path. An output end of the inversion element 1011 may be connected with the second switch 1002 and the third switch 1003. Since the inversion element 1011 inverts an input signal, the inverted signal may be applied to the second switch 1002 and the third switch 1003. That is, while a switch control signal for the on-state is input into the first switch 1001 and the fourth switch 1004, a switch control signal for the off-state may be input into the second switch 1002 and the third switch 1003. Conversely, while a switch control signal for the off-state is input into the first switch 1001 and the fourth switch 1004, a switch control signal for the on-state may be input into the second switch 1002 and the third switch 1003.

Figure 10D:
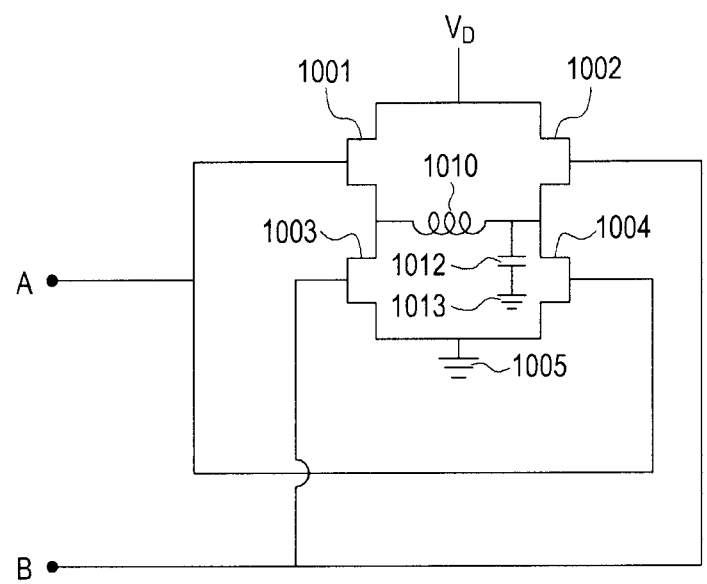

FIG. 10D is a circuit diagram of an electronic device according to another embodiment of the present disclosure. Compared with the electronic device of FIG. 10A, the electronic device of FIG. 10D may further include a capacitor 1012. One end of the capacitor 1012 may be connected with the primary coil 1010, and the other end may be connected with a ground end 1013. The capacitor 1012 may temporarily store an electric charge, so that sinusoidal waves may be more accurately formed. Although not illustrated, the electronic device 101 according to various embodiments of the present disclosure may further include additional coils and/or capacitors connected with the primary coil 1010. As shown in FIGS. 10A to 10D, various types of circuits for generating waveforms may be deployed by embodiments of the present disclosure.

Figure 11:
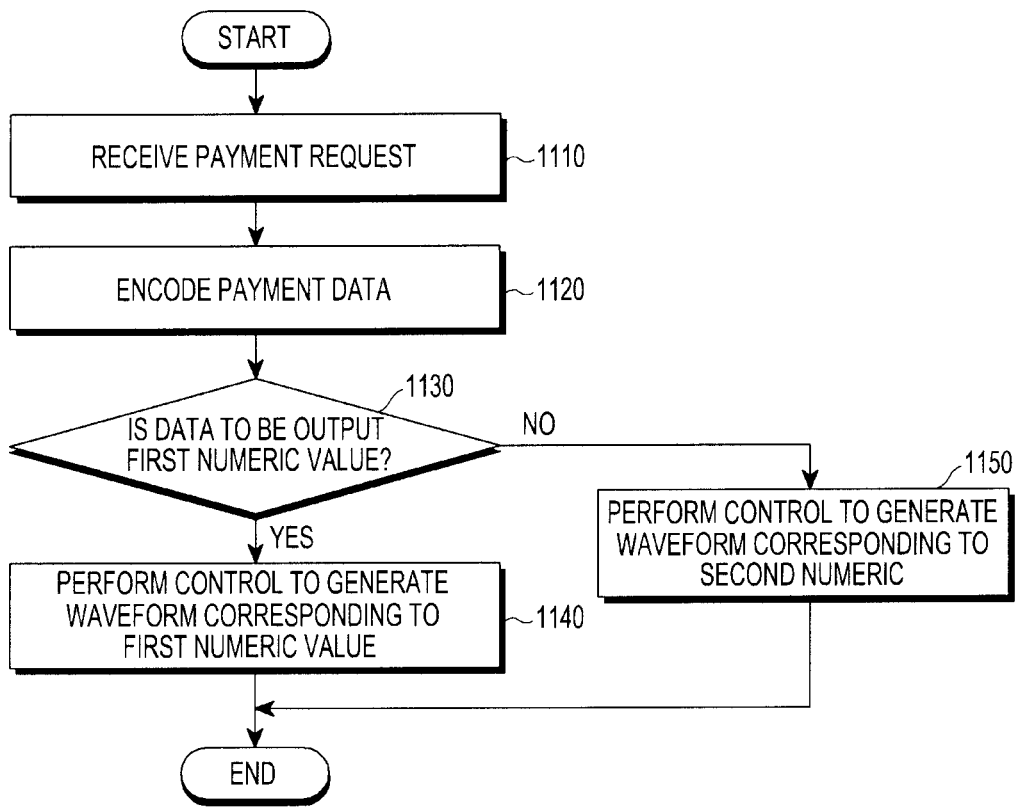
FIG. 11 is a flowchart illustrating a control method of an electronic device according to one embodiment of the present disclosure.

FIG. 11 is a flowchart illustrating a control method of an electronic device according to one embodiment of the present disclosure.

In operation 1110, the electronic device 101 may receive a payment request. The electronic device 101 may receive a payment request after an authentication procedure, such as when the user inputs a password for payment, is successfully performed. Alternatively, the electronic device 101 may detect a payment request event. For example, the electronic device 101 may execute a payment application, display a payment request icon in the payment application, authenticate the user, and detect a payment request event.

In operation 1120, the electronic device 101 may encode payment data. The electronic device 101 may use encoding schemes that use relatively low-power waveform currents as described above.

In operation 1130, the electronic device 101 may determine whether data to be output is a first numeric value, for example, "0." If so, the electronic device 101 may control to generate a magnetic field with a waveform corresponding to the first numeric value, for example, a waveform having a first frequency, in operation 1140. When the data to be output is a second numeric value, for example, "1," the electronic device 101 may control to generate a magnetic field with a waveform corresponding to the second numeric value, for example, a waveform having a second frequency, in operation 1150. In operations 1140 and 1150, generating the magnetic field with the waveform having predetermined frequencies may be done by, for example, controlling the on/off-state of each of the switches 1001 to 1004 in various circuits as shown in FIGS. 10A, 10C, and 10D.

Figure 12:
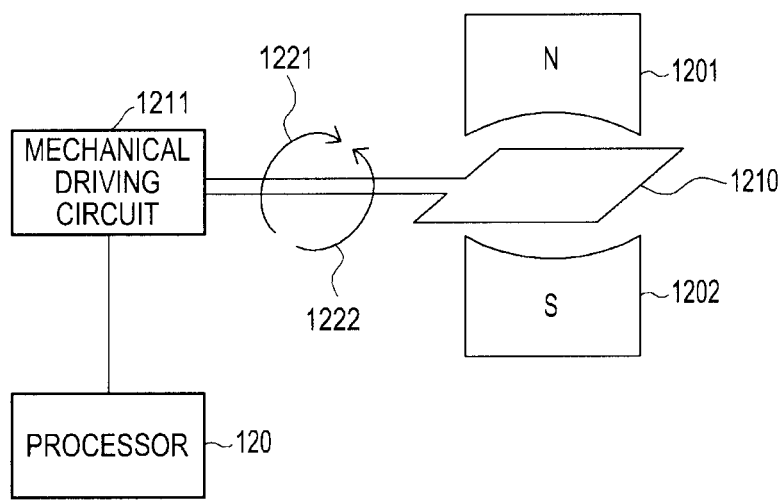
FIG. 12 is a block diagram illustrating an electronic device according to one embodiment of the present disclosure.

FIG. 12 is a block diagram illustrating an electronic device according to various embodiments of the present disclosure.

The processor 120 according to one embodiment of the present disclosure may output a driving control signal corresponding to payment data to a mechanical driving circuit 1211. The mechanical driving circuit 1211 may be physically connected with a coil 1210. The coil 1210 may be disposed between an N-pole magnet 1201 and an S-pole magnet 1202. The mechanical driving circuit 1211 may be, for example, a motor, and may rotate according to control of the processor 120. The motor may rotate the coil 1210 in a first direction 1221 or a second direction 1222. As the rotation occurs between magnets 1201 and 1202, an induced magnetic field may be generated from the coil 1210. The processor 120 may control the rotation direction and/or the rotation speed based on the payment data. For example, the processor 120 may rotate the coil 1210 at a first rotation speed for "0," and may rotate the coil 1210 at a second rotation speed for "1," where the second rotation speed is two times the first rotation speed. Accordingly, a sinusoidal-waveform magnetic field of a first frequency may be generated for "0," and a sinusoidal waveform magnetic field of a second frequency may be generated for "1," where the second frequency may be two times the first frequency. According to the disclosure above, a data reception device may obtain payment data by decoding the intervals between peaks of the sinusoidal waves. In one embodiment, when generating sinusoidal waves, the processor 120 may maintain the rotation direction of the mechanical driving circuit 1211 in one direction and change only the rotation speed to represent binary data. When generating pulse waves instead of sinusoidal waves, the processor 120 may alternately change the rotation direction to generate negative and positive pulse waves.

Figure 13:
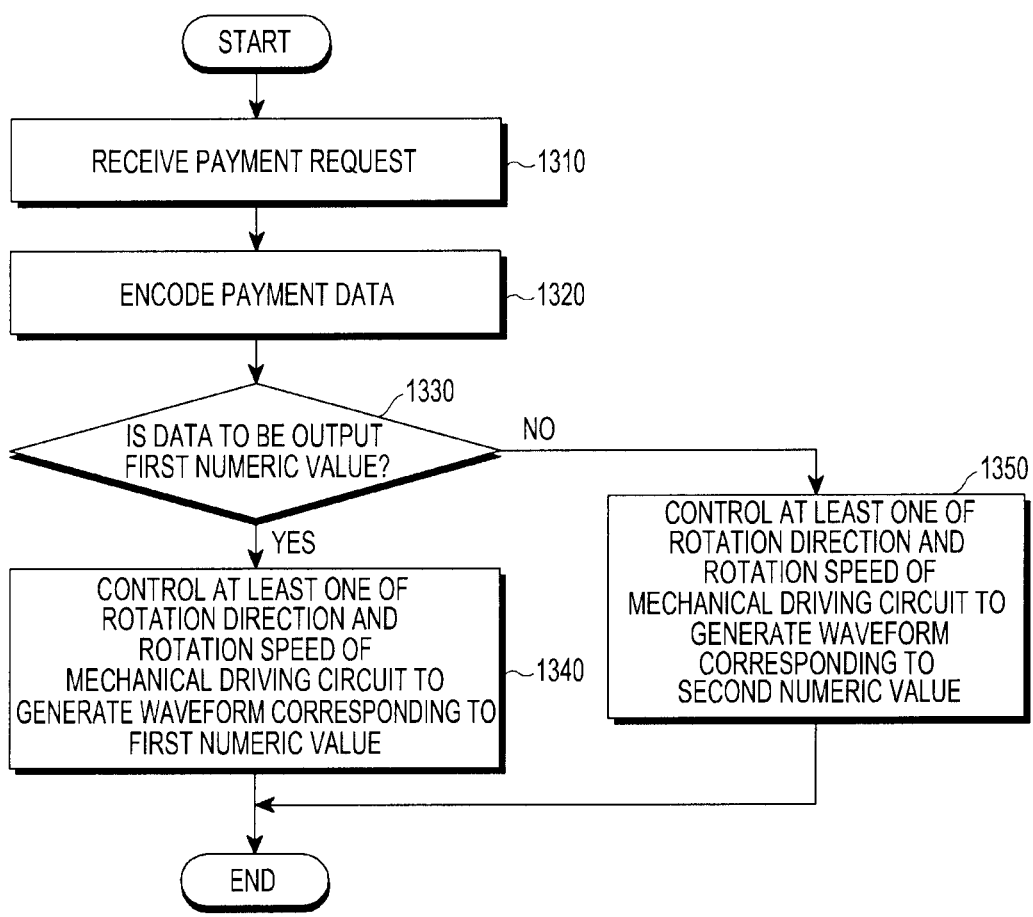
FIG. 13 is a flowchart illustrating a control method of an electronic device according to one embodiment of the present disclosure.

FIG. 13 is a flowchart illustrating a control method of an electronic device according to one embodiment of the present disclosure.

In operation 1310, the electronic device 101 may receive a payment request. In operation 1320, the electronic device 101 may encode payment data. In operation 1330, the electronic device 101 may determine whether data to be output is a first numeric value, for example, a binary "0". If so, the electronic device 101 may control at least one of the rotation direction and the rotation speed of a mechanical driving circuit so as to generate a waveform corresponding to the first numeric value in operation 1340. For example, for "0," the electronic device 101 may control the rotation speed of the driving circuit to be a first speed, so that the electronic device 101 may generate and emit a magnetic field of the first frequency. The electronic device 101 may control at least one of the rotation direction and the rotation speed of a mechanical driving circuit so as to generate a waveform corresponding to a second numeric value in operation 1350, for example the binary "1." For example, the electronic device 101 may control the rotation speed of the driving circuit to be a second speed, so that the electronic device 101 may generate and emit a magnetic field of the second frequency.

Figure 14:
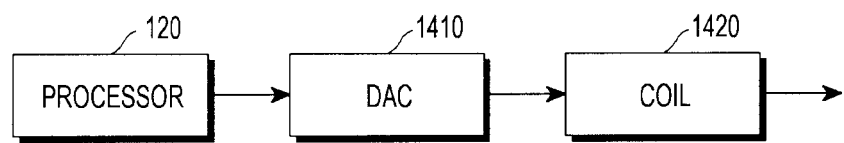
FIG. 14 is a block diagram of an electronic device for generating a magnetic field having a sinusoidal-waveform according to one embodiment of the present disclosure.

FIG. 14 is a block diagram of an electronic device for generating a magnetic field having a sinusoidal waveform according to one embodiment of the present disclosure.

The processor 120 may provide payment data, for example, binary data, to a Digital-to-Analog Converter (DAC) 1410. The DAC 1410 may convert a digital signal of the received binary data into an analog signal. The DAC 1410 may set the frequencies of the analog signal based on the value of the binary data. For example, the DAC 1410 may generate an analog signal of a first frequency for "0," and may generate an analog signal of a second frequency for "1." The DAC 1410 may provide the generated analog signal to a coil 1420. Accordingly, the electronic device 101 may generate and emit a sinusoidal-wave magnetic field having first and second frequencies to represent binary data. The DAC according to one embodiment of the present disclosure may generate the analog signal with reference to a lookup table of various frequencies. According to another embodiment of the present disclosure, the electronic device 101 may generate square waves, and may then filter the generated square waves to create sinusoidal waves.

According to various embodiments of the present disclosure, the electronic device 101 (e.g., an encoding/driving circuit) may generate various types of waveforms whose tangential slopes change based on various schemes. According to one embodiment of the present disclosure, the electronic device 101 selects at least parts of various Fourier series for generating square waves. For example, when the electronic device 101 uses components corresponding to $1^{st}$ to $10^{th}$ harmonic components, the electronic device 101 may generate various types of waveforms. According to various embodiments of the present disclosure, the electronic device 101 may generate various types of waveforms of which the tangential slopes change based on the PWM scheme. For example, the electronic device 101 may adjust the application times period of each of the plurality of currents 1021 to 1031 in FIG. 10B such that various types of waveforms are generated. Accordingly, the electronic device 101 may apply, to a coil, currents or voltages having various types of waveforms. According to various embodiments of the present disclosure, the electronic device 101 may apply currents or voltages having various types of waveforms using the DAC included in the electronic device 101. The DAC according to one embodiment of the present disclosure may be configured in advance to generate various types of waveforms, and may generate and output, to a coil, waveforms of first and second frequencies, depending on the binary data of the payment data.

Figure 15A:
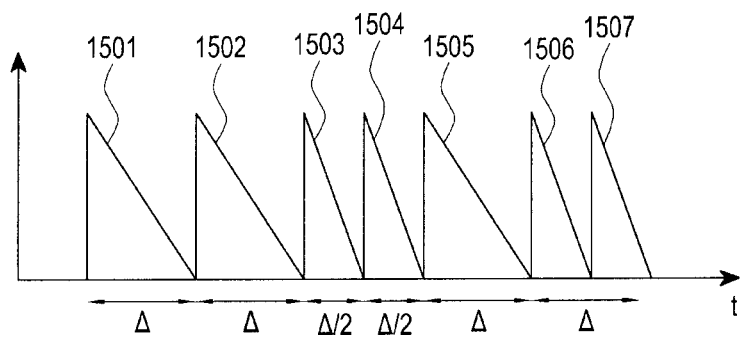
FIG. 15A, FIG. 15B and FIG. 15C are graphs illustrating the voltage or current waveforms applied to various types of primary coils according to one or more embodiments of the present disclosure.
Figure 15B:
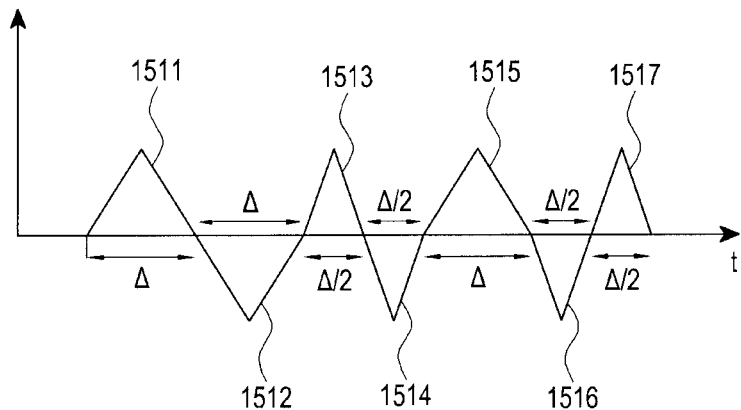
Figure 15C:
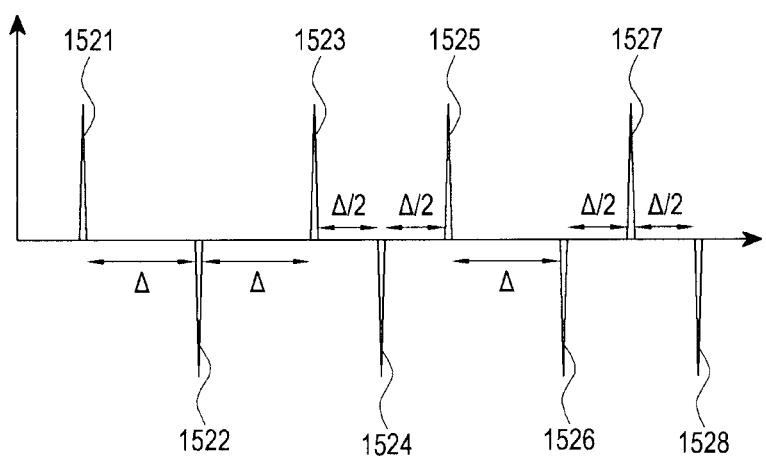

FIGS. 15A to 15C are graphs illustrating the voltage or current waveforms applied to various types of primary coils according to one or more embodiments of the present disclosure.

As illustrated in FIG. 15A, the electronic device 101 may apply a plurality of sawtooth-wave currents or voltages 1501 to 1507 to the primary coil. For example, the electronic device 101 may apply, to the primary coil, sawtooth-wave currents or voltages 1501, 1502, and 1505 having a first time duration ($\Delta$) for "0," and may apply, to the primary coil, sawtooth-wave currents or voltages 1503, 1504, 1506, and 1507 having a second time duration ($\Delta/2$) for "1." Sawtooth waves may consume less power than square waves.

As illustrated in FIG. 15B, the electronic device 101 may apply a plurality of triangular-wave currents or voltages 1511 to 1517 to the primary coil. For example, the electronic device 101 may apply, to the primary coil, triangular-wave currents or voltages 1511, 1512, and 1515 having a first time duration ($\Delta$) for "0," and may apply, to the primary coil, triangular-wave currents or voltages 1513, 1514, 1516, and 1517 having a second time duration ($\Delta/2$) for "1."Triangular waves may also consume less power than square waves.

As illustrated in FIG. 15C, the electronic device 101 may apply a plurality of pulse-wave currents or voltages 1521 to 1528 to the primary coil. For example, the electronic device 101 may generate a pulse wave such that the time interval between the pulse wave and a previous pulse wave is a first time duration ($\Delta$) for "0." For example, in FIG. 15C, the electronic device 101 applies a pulse wave 1521, and applies a pulse wave 1522 after the first time duration ($\Delta$) elapses, in order to represent the binary "0." In addition, the electronic device 101 may generate a pulse wave such that the time interval between the pulse wave and a previous pulse wave is a second time duration ($\Delta/2$) for "1." For example, in FIG. 15C, the electronic device 101 applies a pulse wave 1523, applies a pulse wave 1524 after the second time duration ($\Delta/2$) elapses, and applies a pulse wave 1525 again after the second time length ($\Delta/2$) elapses, to represent the binary "1." Pulse waves may also consume less power than square waves.

In addition to the above-described waveforms, currents or voltages in various types of waveforms having various frequencies or time intervals may be applied to the primary coil. It will be apparent to those skilled in the art that any waveform that consumes less power than conventional square waves may be used without limitation.

Figure 16:
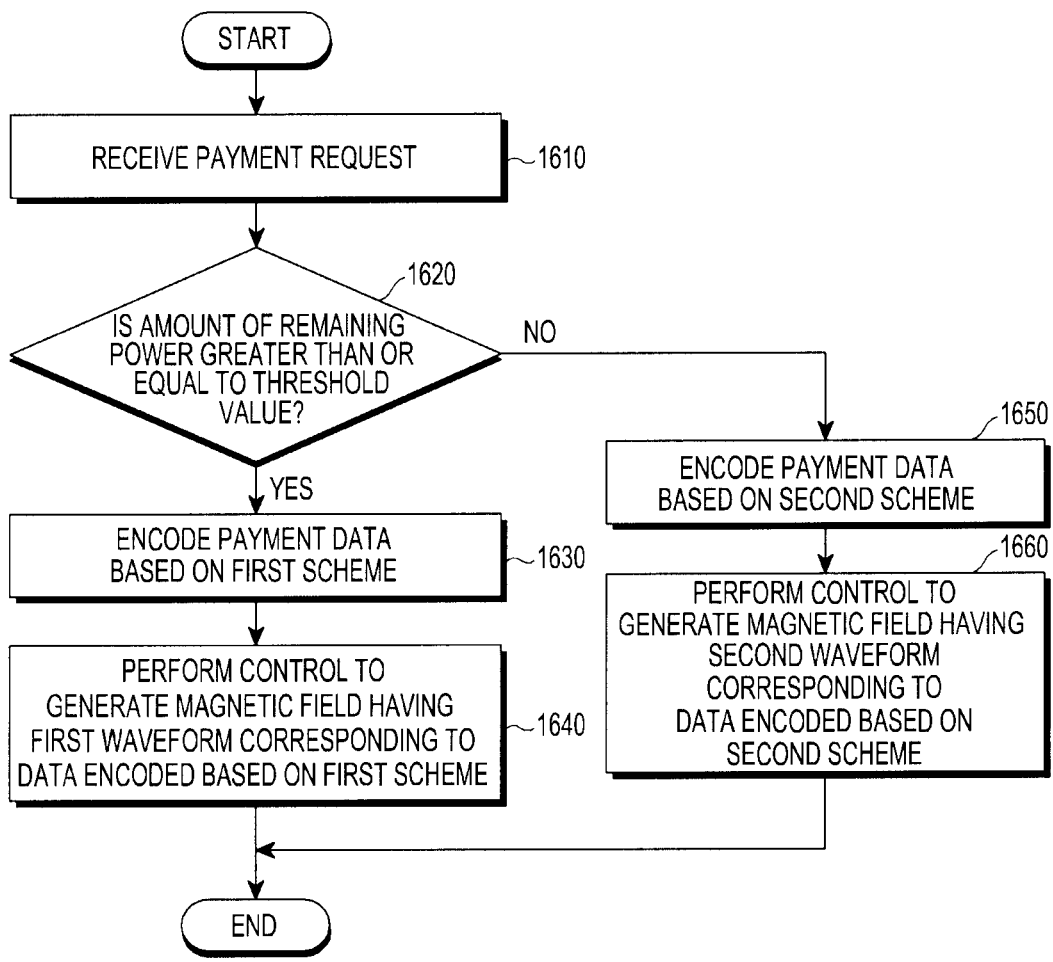
FIG. 16 is a flowchart illustrating a control method of an electronic device according to one embodiment of the present disclosure.

FIG. 16 is a flowchart illustrating a control method of an electronic device according to one embodiment of the present disclosure.

In operation 1610, the electronic device 101 may receive a payment request. In operation 1620, the electronic device 101 may determine whether the amount of remaining power of its embedded battery (not illustrated) is greater than or equal to a threshold value. When the amount of remaining power is greater than or equal to the threshold value, the electronic device 101 may encode payment data based on a first scheme in operation 1630. Herein, the first scheme may use square-waves. In operation 1640, the electronic device 101 may control to generate a first-waveform magnetic field generated based on the first scheme. When the amount of remaining power is less than the threshold value, the electronic device 101 may encode the payment data based on a second scheme in operation 1650. The second scheme may use a waveform that is different from square waves, i.e. a waveform consume less power. In operation 1660, the electronic device 101 may control to generate a second-waveform magnetic field generated based on the second scheme.

Figure 17:
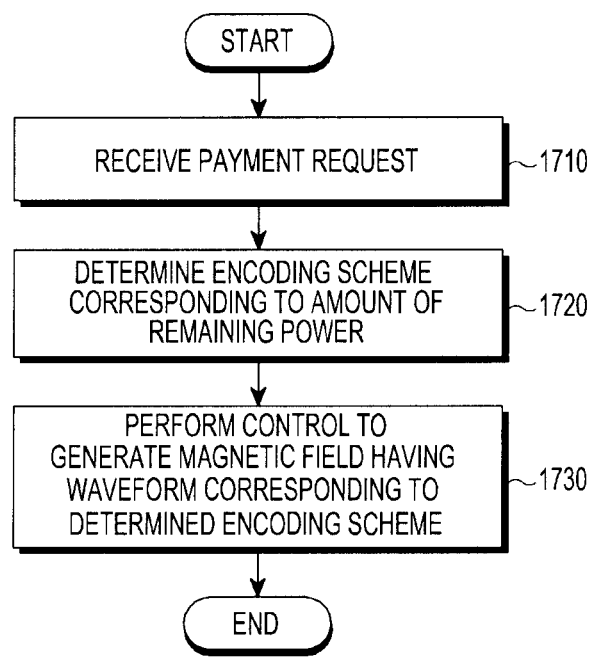
FIG. 17 is a flowchart illustrating a control method of an electronic device according to one embodiment of the present disclosure.

FIG. 17 is a flowchart illustrating a control method of an electronic device according to one embodiment of the present disclosure.

In operation 1710, the electronic device 101 may receive a payment request. In operation 1720, the electronic device 101 may determine an encoding scheme corresponding to the amount of remaining power of its battery (not illustrated). For example, the electronic device 101 may store, in advance, linkage information between the amount of remaining power of the battery and encoding schemes. The electronic device 101 may determine an encoding scheme, which corresponds to the determined amount of remaining power, with reference to the linkage information. In operation 1730, the electronic device 101 may control to generate a magnetic field based on the determined encoding scheme.

As described above, various encoding schemes may be applied based on the amount of power remaining in the battery of the electronic device.

A control method of an electronic device including a coil, in order to transmit data according to one embodiment of the present disclosure, may include: obtaining card information stored in a memory of the electronic device; when a first part of the card information is a first value, applying a first voltage or a first current having a first waveform having a first frequency to the coil, wherein a first tangential slope of a first amplitude of the first waveform for time changes in at least a part of a first interval corresponding to the first part; and when a second part of the card information is a second value, applying a second voltage or a second current having a current second waveform having a second frequency to the coil, wherein the second frequency is twice the first frequency, and a second tangential slope of a second amplitude of the second waveform for time changes in at least a part of a second interval corresponding to the second part.

The electronic device according to one embodiment of the present disclosure may include a plurality of switches connected with the coil, and the control method according to one embodiment of the present disclosure may include controlling an on-state or an off-state of each of the plurality of switches to generate the first voltage or the first current, or the second voltage or the second current.

According to one embodiment of the present disclosure, wherein the first voltage or the first current, or the second voltage or the second current is a sinusoidal wave, a sawtooth wave, a triangular wave, or a pulse wave.

The electronic device according to one embodiment of the present disclosure may include a driving circuit for rotating the coil, an N-pole magnet disposed on one side of the coil, and an S-pole magnet disposed on other side direction of the coil opposite the one side, and the control method according to one embodiment of the present disclosure may include rotating the coil at a first speed using the driving circuit in order to generate the first voltage or the first current; and rotating the coil at a second speed using the driving circuit in order to generate the second voltage or the second current.

The electronic device according to one embodiment of the present disclosure may include a digital-to-analog converter (DAC), and the first voltage or the first current or the second voltage or the second current is generated using the DA.

Having thus described different embodiments of using sinusoidal waves, for example, to generate magnetic signals for use in transmitting payment data, it should be apparent to those skilled in the art that certain advantages have been achieved, including improved power consumption. Various embodiments disclosed herein are provided to easily explain technical details of the present disclosure and to assist in the understanding of the present disclosure, and are not intended to limit the scope of the present disclosure. Therefore, it should be construed that all modifications and changes based on the technical ideas of the present disclosure fall within the scope of the present disclosure.

What is claimed is:

1. An electronic device, comprising:
   a memory;
   a coil;
   a waveform-generating circuit; and
   a processor,
   wherein the processor is configured to:
      obtain card information stored in the memory;
      when a first part of the card information is a first value, apply, using the waveform-generating circuit, a first voltage or a first current having a first waveform having a first frequency to the coil, wherein a first tangential slope of a first amplitude of the first waveform for time changes in at least a part of a first interval corresponding to the first part; and
      when a second part of the card information is a second value, apply, using the waveform-generating circuit, a second voltage or a second current having current second waveform having a second frequency to the coil, wherein the second frequency is twice the first frequency, and a second tangential slope of a second amplitude of the second waveform for time changes in at least a part of a second interval corresponding to the second part,
   wherein the waveform-generating circuit comprises a plurality of switches connected to the coil,
   wherein the processor is configured to control an on-state or an off-state of each of the plurality of switches to generate the first voltage or the first current, or the second voltage or the second current, and
   wherein the plurality of switches comprises:
      a first switch disposed between one end of the coil and a voltage source that provides a designated voltage;
      a second switch disposed between other end of the coil and the voltage source;
      a third switch disposed between the one end of the coil and a ground; and
      a fourth switch disposed between the other end of the coil and the ground.

2. The electronic device of claim 1, wherein the processor is configured to control the waveform-generating circuit to:
   keep the second switch and the third switch in off state and periodically switch the first switch and the fourth switch between on state and off state in order to apply positive part of the first voltage or the first current, or positive part of the second voltage or the second current to the coil; and
   keep the first switch and the fourth switch in off state and periodically switch the second switch and the third switch between on state and off state in order to apply negative part of the first voltage or the first current, or negative part of the second voltage or the second current to the coil.

3. The electronic device of claim 2, wherein the processor is configured to change a period in which the first switch and the fourth switch are in the on-state, a voltage or a current which has positive part of modulated waveform is applied to the coil.

4. The electronic device of claim 2, wherein the processor is configured to change a period in which the second switch and the third switch are in the on-state, a voltage or a current which has negative part of modulated waveform is applied to the coil.

5. The electronic device of claim 1, wherein the first voltage or the first current or the second voltage or the second current is a sinusoidal wave, a sawtooth wave, a triangular wave, or a pulse wave.

6. The electronic device of claim 1, wherein the waveform-generating circuit comprises:
   a driving circuit for rotating the coil;
   an N-pole magnet disposed on one side of the coil; and
   an S-pole magnet disposed on other side of the coil opposite the one side.

7. The electronic device of claim 6, wherein the processor is configured to:
   rotate the coil at a first speed using the driving circuit in order to generate the first voltage or the first current; and
   rotate the coil at a second speed using the driving circuit in order to generate the second voltage or the second current.

8. The electronic device of claim 1, wherein the waveform-generating circuit includes a digital-to-analog converter (DAC), and
   the processor is configured to generate the first voltage or the first current or the second voltage or the second current using the DAC.

9. An electronic device, comprising:
a memory;
a coil;
a waveform-generating circuit; and
a processor,
wherein the processor is configured to:
  obtain card information stored in the memory;
  when a first part of the card information is a first value, apply, using the waveform-generating circuit, a first voltage or a first current having a first waveform having a first frequency to the coil, wherein a first tangential slope of a first amplitude of the first waveform for time changes in a first interval corresponding to the first part; and
  when a second part of the card information is a second value, apply, using the waveform-generating circuit, a second voltage or a second current having current second waveform having a second frequency to the coil, wherein the second frequency is higher than the first frequency, and a second tangential slope of a second amplitude of the second waveform for time changes in a second interval corresponding to the second part,
wherein the waveform-generating circuit comprises a plurality of switches connected to the coil,
wherein the processor is configured to control an on-state or an off-state of each of the plurality of switches to generate the first voltage or the first current or the second voltage or the second current, and
wherein the plurality of switches comprises:
  a first switch disposed between one end of the coil and a voltage source that provides a designated voltage;
  a second switch disposed between other end of the coil and the voltage source;
  a third switch disposed between the one end of the coil and a ground; and
  a fourth switch disposed between the other end of the coil and the ground.

10. The electronic device of claim 9, wherein the first voltage or the first current, or the second voltage or the second current is a sinusoidal wave, a sawtooth wave, a triangular wave, or a pulse wave.

11. The electronic device of claim 10, wherein the processor is configured to select one of the sinusoidal wave, sawtooth wave, triangular wave, and pulse wave based on an amount of remaining charge of a battery of the electronic device.

12. The electronic device of claim 9, wherein the second frequency is an integer multiple of the first frequency.

\* \* \* \* \*